(12) United States Patent
Okada et al.

(10) Patent No.: US 11,068,735 B2
(45) Date of Patent: Jul. 20, 2021

(54) RELIABILITY CALCULATION APPARATUS

(71) Applicant: DENSO CORPORATION, Kariya (JP)

(72) Inventors: Masaya Okada, Nisshin (JP); Shunya Kumano, Nisshin (JP); Hiroaki Niino, Kariya (JP); Mitsuhiro Tokimasa, Kariya (JP); Takumi Uematsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 174 days.

(21) Appl. No.: 16/206,004

(22) Filed: Nov. 30, 2018

(65) Prior Publication Data

US 2019/0171896 A1   Jun. 6, 2019

(30) Foreign Application Priority Data

Dec. 5, 2017   (JP) .............................. JP2017-233168
May 10, 2018   (JP) .............................. JP2018-091062

(51) Int. Cl.
*G06K 9/00*   (2006.01)
*G06K 9/03*   (2006.01)
(Continued)

(52) U.S. Cl.
CPC ........... *G06K 9/03* (2013.01); *G06K 9/00798* (2013.01); *G06K 9/00805* (2013.01);
(Continued)

(58) Field of Classification Search
CPC .. G06K 9/00798; G06K 9/00805; G06K 9/03; G06K 9/3241; G06K 9/6202; G06K 9/6215; G06K 2209/23; G06T 2207/30256

See application file for complete search history.

(56) References Cited

U.S. PATENT DOCUMENTS 6,471,420 B1 * 10/2002  Maekawa ............... G10L 25/87
                                                                        704/250
2005/0125154 A1    6/2005  Kawasaki
(Continued)

FOREIGN PATENT DOCUMENTS

JP   2013-097714 A   5/2013
JP   2016-162323 A   9/2016
(Continued)

OTHER PUBLICATIONS

Dierkes et al. ("Towards a Multi-hypothesis Road Representation for Automated Driving," IEEE 18th International Conference on Intelligent Transportation Systems, Sep. 15-18, 2015) (Year: 2015).*
(Continued)

*Primary Examiner* — Yubin Hung
(74) *Attorney, Agent, or Firm* — Maschoff Brennan

(57) ABSTRACT

A reliability calculation apparatus calculates a reliability of a recognized object that is recognized as being present on a route on which a vehicle travels. The reliability of the recognized object is used for driving control of the vehicle. In the reliability calculation apparatus, a provisional reliability calculating unit determines a feature quantity of each of a plurality of recognized objects, selects a plurality of pairs of recognized objects from the plurality of recognized objects, determines a difference in feature quantity of each pair of recognized objects, and calculates a reliability that decreases as the difference in feature quantity increases as a provisional reliability of each pair of recognized objects. An integrated reliability calculating unit calculates an integrated reliability of each recognized object from the provisional reliabilities of the plurality of pairs of recognized objects.

13 Claims, 17 Drawing Sheets

(51) Int. Cl.
*G06K 9/62* (2006.01)
*G06T 7/50* (2017.01)
*G06K 9/32* (2006.01)

(52) U.S. Cl.
CPC ......... *G06K 9/3241* (2013.01); *G06K 9/6202* (2013.01); *G06K 9/6215* (2013.01); *G06T 7/50* (2017.01); *G06K 2209/23* (2013.01); *G06T 2207/30256* (2013.01)

(56) References Cited

U.S. PATENT DOCUMENTS

| | | | | |
|---|---|---|---|---|
| 2009/0276153 | A1* | 11/2009 | Lee | G01C 21/3602 701/414 |
| 2009/0304232 | A1* | 12/2009 | Tsukizawa | G06K 9/0061 382/103 |
| 2011/0216944 | A1 | 9/2011 | Kawasaki et al. | |
| 2013/0343601 | A1* | 12/2013 | Jia | G06F 3/011 382/103 |
| 2015/0348275 | A1* | 12/2015 | Kumano | G06T 7/13 382/199 |
| 2016/0005199 | A1* | 1/2016 | Park | A63F 13/216 345/633 |
| 2016/0327948 | A1* | 11/2016 | Taguchi | G05D 1/0077 |
| 2016/0353049 | A1* | 12/2016 | Maley | G06T 11/20 |
| 2017/0060136 | A1* | 3/2017 | Kobayashi | B60W 30/12 |
| 2017/0300764 | A1 | 10/2017 | Kakegawa et al. | |
| 2017/0326981 | A1 | 11/2017 | Masui et al. | |
| 2017/0327118 | A1 | 11/2017 | Masui et al. | |
| 2017/0345182 | A1* | 11/2017 | Sano | G06N 7/005 |
| 2018/0247138 | A1* | 8/2018 | Kang | B60W 50/14 |

FOREIGN PATENT DOCUMENTS

| | | |
|---|---|---|
| JP | 2016-173711 A | 9/2016 |
| JP | 2017-045356 A | 3/2017 |

OTHER PUBLICATIONS

Polychronopoulos et al. ("Sensor Fusion for Predicting Vehicles' Path for Collision Avoidance Systems," IEEE Transactions on Intelligent Transportation Systems, vol. 8 , No. 3, Sep. 2007) (Year: 2007).*

Scharwachter et al. ("Visual guard rail detection for advanced highway assistance systems," IEEE Intelligent Vehicles Symposium Proceedings, Jun. 8-11, 2014) (Year: 2014).*

Irie et al. ("Localization and road boundary recognition in urban environments using digital street maps," IEEE International Conference on Robotics and Automation, May 14-18, 2012) (Year: 2012).*

* cited by examiner

FEATURE QUANTITIES
Cw : CURVATURE OF TRAVEL ROAD BOUNDARY LINE Twl2
Cv : CURVATURE OF OUTER VEHICLE TRAVEL LOCUS Tov
Cr : CURVATURE OF ROADSIDE OBJECT Trso $$Rc = \frac{Ra \cdot Rb}{Ra\ Rb + (1 - Ra)(1 - Rb)}$$

FIG.7

| RELIABILITY / OBJECT | PROVISIONAL RELIABILITY Ri | | | INTEGRATED RELIABILITY Rt |
|---|---|---|---|---|
| | PROVISIONAL RELIABILITY WHEN PAIRED WITH TRAVEL ROAD BOUNDARY LINE | PROVISIONAL RELIABILITY WHEN PAIRED WITH OTHER VEHICLE TRAVEL LOCUS | PROVISIONAL RELIABILITY WHEN PAIRED WITH ROADSIDE OBJECT | |
| TRAVEL ROAD BOUNDARY LINE Twl2 | - | 0.20 | 0.15 | 0.04 |
| OTHER VEHICLE TRAVEL LOCUS Tov | 0.20 | - | 0.85 | 0.59 |
| ROADSIDE OBJECT Trso | 0.15 | 0.85 | - | 0.50 |

FIG.8

FEATURE QUANTITIES

Xw: LATERAL-DIRECTION OFFSET OF TRAVEL ROAD BOUNDARY LINE Twl2
Xv: LATERAL-DIRECTION OFFSET OF OTHER VEHICLE TRAVEL LOCUS Tov
Xr: LATERAL-DIRECTION OFFSET OF ROADSIDE OBJECT Trso

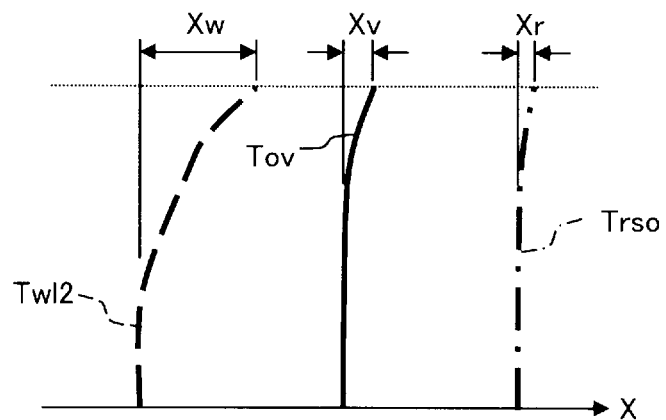

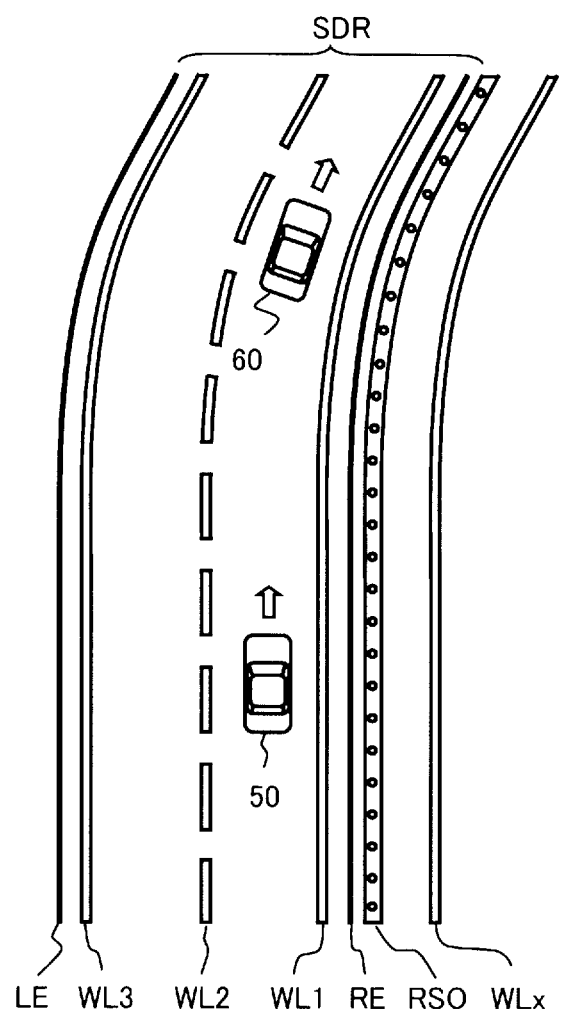

FEATURE QUANTITIES
Cw : CURVATURE OF TRAVEL ROAD BOUNDARY LINE Twl2
Cv : CURVATURE OF OTHER VEHICLE TRAVEL LOCUS Tov
Cr : CURVATURE OF ROADSIDE OBJECT Trso
Cx : CURVATURE OF TRAVEL ROAD BOUNDARY LINE Twlx FEATURE QUANTITIES
Cv: CURVATURE OF OTHER VEHICLE TRAVEL LOCUS Tov
Cr: CURVATURE OF ROADSIDE OBJECT Trso
Cx: CURVATURE OF TRAVEL ROAD BOUNDARY LINE Twlx

FIG.14

| RELIABILITY<br>OBJECT | FIRST TYPE OF PROVISIONAL RELIABILITY Ri (FIG. 5) | | | SECOND TYPE OF PROVISIONAL RELIABILITY Rj (FIG. 13) | | INTEGRATED RELIABILITY Rt |
|---|---|---|---|---|---|---|
| | PROVISIONAL RELIABILITY WHEN PAIRED WITH TRAVEL ROAD BOUNDARY LINE | PROVISIONAL RELIABILITY WHEN PAIRED WITH OTHER VEHICLE TRAVEL LOCUS | PROVISIONAL RELIABILITY WHEN PAIRED WITH ROADSIDE OBJECT | PROVISIONAL RELIABILITY WHEN PAIRED WITH TRAVEL ROAD BOUNDARY LINE | PROVISIONAL RELIABILITY WHEN PAIRED WITH ROADSIDE OBJECT | |
| TRAVEL ROAD BOUNDARY LINE $T_{wlx}$ | - | 0.85 | 0.85 | - | 0.0001 | 0.003 |
| OTHER VEHICLE TRAVEL LOCUS $T_{ov}$ | 0.85 | - | 0.85 | - | - | 0.97 |
| ROADSIDE OBJECT $T_{rso}$ | 0.85 | 0.85 | - | 0.0001 | - | 0.003 |

⟨WHEN TRAVEL ROAD BOUNDARY LINE Twl2 MEETS EXTRAPOLATION CONDITIONS⟩

⟨EXTRAPOLATION OF TRAVEL ROAD BOUNDARY LINE Twl2⟩

FIG.19

<SIXTH EMBODIMENT: CALCULATION OF PROVISIONAL RELIABILITY OF OTHER VEHICLE TRAVEL LOCUS Tov>

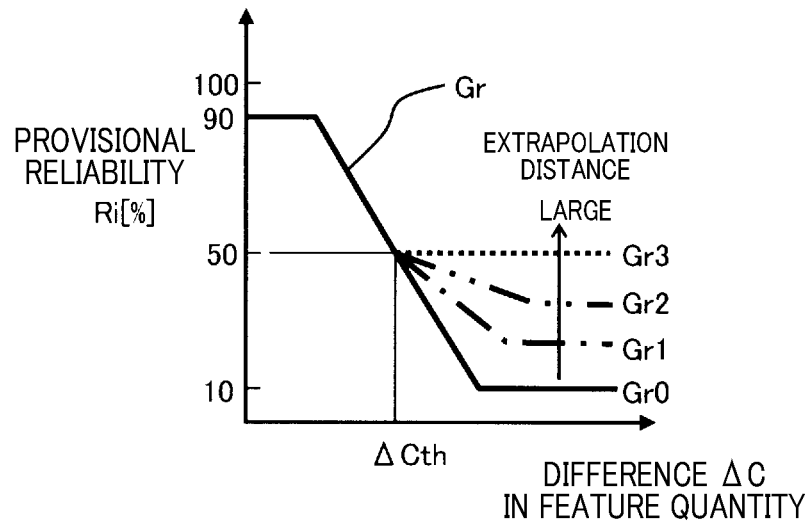

FIG.20

| RELIABILITY / OBJECT | PROVISIONAL RELIABILITY Ri | | | INTEGRATED RELIABILITY Rt |
|---|---|---|---|---|
| | PROVISIONAL RELIABILITY WHEN PAIRED WITH TRAVEL ROAD BOUNDARY LINE | PROVISIONAL RELIABILITY WHEN PAIRED WITH OTHER VEHICLE TRAVEL LOCUS | PROVISIONAL RELIABILITY WHEN PAIRED WITH ROADSIDE OBJECT | |
| TRAVEL ROAD BOUNDARY LINE Twl2 | - | 0.20 | 0.15 | 0.04 |
| OTHER VEHICLE TRAVEL LOCUS Tov | 0.50 * | - | 0.85 | 0.85 * |
| ROADSIDE OBJECT Trso | 0.15 | 0.85 | - | 0.50 |

<WHEN TRAVEL ROAD BOUNDARY LINE Twl2 MEETS EXTRAPOLATION CONDITIONS>

<EXTRAPOLATION OF TRAVEL ROAD BOUNDARY LINE Twl2>

⟨SEVENTH EMBODIMENT: CALCULATION OF PROVISIONAL RELIABILITY OF OTHER VEHICLE TRAVEL LOCUS Tov⟩

<WHEN TRAVEL ROAD BOUNDARY LINE Twl2 MEETS EXTRAPOLATION CONDITIONS>

<EXTRAPOLATION OF TRAVEL ROAD BOUNDARY LINE Twl2>

RELIABILITY CALCULATION APPARATUS

CROSS-REFERENCE TO RELATED APPLICATION

This application is based on and claims the benefit of priority from earlier Japanese Patent Application Nos. 2017-233168, filed Dec. 5, 2017, and 2018-091062, filed May 10, 2018, the descriptions of which are incorporated herein by reference.

BACKGROUND

Technical Field

The present disclosure relates to a technology for calculating a reliability of a recognized object that is recognized as being present on a travel route on which a vehicle travels, for use in driving control of the vehicle.

Related Art

In automatic driving of a vehicle, a shape (travel road shape) of a travel road on which an own vehicle travels is recognized, and driving control is performed such that the own vehicle travels along the recognized travel road shape. For the travel road shape to be recognized, the shapes of a plurality of objects that may be used to determine the travel road shape are recognized through use of various types of onboard sensors, such as cameras and radars.

For example, such objects include travel road boundary lines (lane markers) such as white lines and roadside objects such as guardrails. However, a certain degree of erroneous recognition is unavoidable in the recognition of objects using the onboard sensors. Therefore, a determination regarding whether or not erroneous recognition is present in the objects is preferably performed.

In JP-A-2016-210285, differences between driving parameters (such as curvatures) respectively acquired from a plurality of recognized objects are weighted and added. The added result is compared with a threshold. Whether or not erroneous recognition is present in the recognized objects is thereby determined.

In the case in JP-A-2016-210285, a determination that erroneous recognition is present in any of the plurality of recognized objects can be made. However, the recognized object of which the erroneous recognition is highly likely to be present cannot be determined. To determine the travel road shape to be used for driving control of the vehicle, a technology for determining the recognized object of which erroneous recognition is highly likely to be present is desired.

SUMMARY

An exemplary embodiment of the present disclosure provides a reliability calculation apparatus that calculates a reliability of a recognized object that is recognized as being present on a route on which a vehicle travels. The reliability of the recognized object is used for driving control of the vehicle. The reliability calculation apparatus includes a provisional reliability calculating unit and an integrated reliability calculating unit. The provisional reliability calculating unit determines a feature quantity of each of a plurality of recognized objects, selects a plurality of pairs of recognized objects from the plurality of recognized objects, determines a difference in feature quantity of each pair of recognized objects, and calculates, as a provisional reliability of each pair of recognized objects, a reliability that decreases as the difference in feature quantity increases. The integrated reliability calculating unit calculates an integrated reliability of each recognized object from the provisional reliabilities of the plurality of pairs of recognized objects.

In cases in which a recognized object that is highly likely to be erroneously recognized is present among a plurality of recognized objects, the provisional reliability of a pair of recognized objects including the recognized object becomes a low value. The provisional reliability of a pair of recognized objects that does not include the recognized object becomes a high value. When the integrated reliability of each recognized object is calculated using the provisional reliabilities, a low value is obtained as the integrated reliability regarding a recognized object that is highly likely to be erroneously recognized. Therefore, when the integrated reliability is used, the recognized object that is highly likely to be erroneously recognized can be determined from the plurality of recognized objects.

BRIEF DESCRIPTION OF THE DRAWINGS

In the accompanying drawings:

FIG. 7 is an explanatory diagram of a calculation example of the provisional reliability and the integrated reliability;

FIG. 8 is an explanatory diagram of the shapes and feature quantities of the recognized objects according to a second embodiment:

FIG. 9 is an explanatory diagram of an example of a plurality of objects associated with the travel road shape according to a third embodiment;

FIG. 14 is an explanatory diagram of a calculation example of the provisional reliability and the integrated reliability according to the fourth embodiment;

FIG. 19 is a graph of an example of a relationship between the difference in feature quantities and the provisional reliability according to the sixth embodiment;

FIG. 20 is an explanatory diagram of a calculation example of the provisional reliability and the integrated reliability according to the sixth embodiment;

DESCRIPTION OF THE EMBODIMENTS

A. First Embodiment

Figure 1:
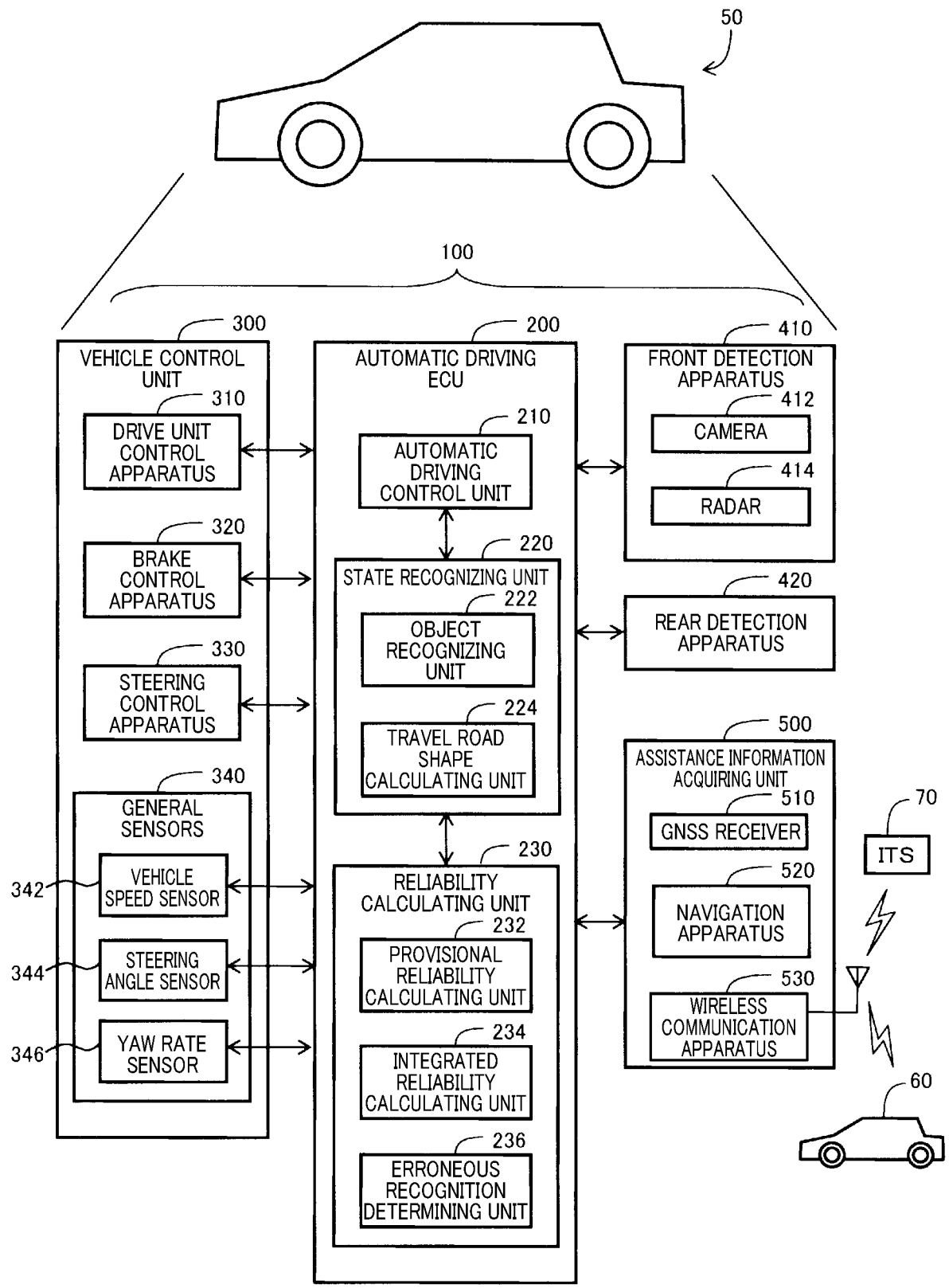
FIG. 1 is a block diagram of a configuration of an automatic driving control system according to a first embodiment.

As shown in FIG. 1, a vehicle 50 according to a first embodiment includes an automatic driving control system 100 that corresponds to a vehicle control system. The automatic driving control system 100 includes an automatic driving electronic control unit (ECU) 200, a vehicle control unit 300, a front detection apparatus 410, a rear detection apparatus 420, and an assistance information acquiring unit 500. In the present description, the vehicle 50 is also referred to as an "own vehicle 50."

The automatic driving ECU 200 is a circuit that includes a central processing unit (CPU) and a memory. The automatic driving ECU 200 actualizes the respective functions of an automatic driving control unit 210, a state recognizing unit 220, and a reliability calculating unit 230 by running a computer program that is stored in a non-volatile storage medium. A part of the functions of the automatic driving ECU 200 may be implemented by a hardware circuit.

The state recognizing unit 220 recognizes the driving states of the own vehicle 50 and an other vehicle 60, and the surrounding environment using various types of information and detection values that are provided by the front detection apparatus 410, the rear detection apparatus 420, the assistance information acquiring unit 500, and general sensors 340. According to the present embodiment, the state recognizing unit 220 includes an object recognizing unit 222 and a travel road shape calculating unit 224.

The object recognizing unit 222 recognizes an object that is to be used to determine a shape (travel road shape) of a travel road on which the own vehicle 50 travels. The object recognizing unit 222 uses various types of onboard sensors, such as a camera 412 and a radar 414 of the front detection apparatus 410, to recognize the object.

As such an object, the object recognizing unit 222 preferably recognizes at least one of a plurality of types including travel road boundary lines such as a white line, a travel locus (travel trajectory) of another vehicle (simply referred to as an "other-vehicle travel locus") that travels ahead of the own vehicle 50, and roadside objects such as a guardrail. These three types of objects have shapes that are associated with the travel road shape. Therefore, these three types of objects are useful in calculation of the travel road shape. In addition to the guardrail, a curbstone on a shoulder of a travel road, and a line on a left edge or a right edge of a travel road surface may be used as the roadside object.

The travel road shape calculating unit 224 calculates the shape (travel road shape) of a travel road on which the own vehicle 50 travels. The travel road shape calculating unit 224 uses the shape of the object recognized by the object recognizing unit 222 to calculate the travel road shape. However, according to the present embodiment, when calculating the travel road shape, the travel road shape calculating unit 224 uses a reliability (reliability level) of the object that is calculated by the reliability calculating unit 230. This point will be described hereafter.

The reliability calculating unit 230 calculates the reliability (recognition reliability) of a recognized object that has been recognized by the object recognizing unit 222. According to the present embodiment, the reliability calculating unit 230 includes a provisional reliability calculating unit 232, an integrated reliability calculating unit 234, and an erroneous recognition determining unit 236. The details of processes performed by the provisional reliability calculating unit 232, the integrated reliability calculating unit 234, and the erroneous recognition determining unit 236 will be described hereafter. The reliability calculating unit 230 is also referred to as a "reliability calculation apparatus."

The vehicle control unit 300 is a section that performs various types of control for driving the vehicle 50. The vehicle control unit 300 is used for both automatic driving and manual driving. The vehicle control unit 300 includes a drive unit control apparatus 310, a brake control apparatus 320, a steering angle control apparatus 330, and the general sensors 340.

The drive unit control apparatus 310 provides a function for controlling a drive unit (not shown) that drives the wheels of the vehicle 50. At least one of a plurality of motors including an internal combustion engine and an electric motor may be used as the drive unit for the wheels.

The brake control apparatus 320 performs brake control of the vehicle 50. For example, the brake control apparatus 320 is configured as an electronically controlled brake system (ECB).

The steering angle control apparatus 330 controls a steering angle of the wheels of the vehicle 50. The "steering angle" refers to an average steering angle of the two front wheels of the vehicle 50. For example, the steering angle control apparatus 330 is configured as an electric power steering system (EPS).

The general sensors 340 include a vehicle speed sensor 342, a steering angle sensor 344, and a yaw rate sensor 346. The general sensors 340 are general sensors that are required for driving the vehicle 50. The general sensors 340 include sensors that are used in either of automatic driving and manual driving.

The front detection apparatus 410 acquires information related to various types of objects, such as objects and road facilities (such as traffic lanes, intersections, and traffic lights), that are present ahead of the own vehicle 50. The front detection apparatus 410 uses onboard sensors to acquire the information. According to the present embodiment, the front detection apparatus 410 includes the camera 412 and the radar 414.

A monocular camera or a stereo camera may be used as the camera 412. In addition, the camera 412 is preferably a color camera to enable differentiation between the colors of the objects (such as differentiation between a white travel road boundary line and a yellow travel road boundary line). Various types of radars that emit electromagnetic waves, such as a light detection and ranging (LIDAR) apparatus that emits light or a radar (such as a millimeter-wave radar) that emits radio waves, may be used as the radar 414.

The rear detection apparatus 420 acquires information related to various types of objects, such as objects and road facilities, that are present to the rear of the own vehicle 50. The rear detection apparatus 420 can also be configured to include onboard sensors similar to those of the front detection apparatus 410.

The assistance information acquiring unit 500 acquires various types of assistance information for automatic driving. The assistance information acquiring unit 500 includes a global navigation satellite system (GNSS) receiver 510, a navigation apparatus 520, and a wireless communication apparatus 530.

The GNSS receiver 510 determines a current position (longitude and latitude) of the own vehicle 50 based on navigation signals received from satellites configuring the GNSS. The navigation apparatus 520 provides a function for determining a predicted route for automatic driving based on a destination and the own vehicle position detected by the GNSS receiver 510. In addition to the GNSS receiver 510, other sensors, such as a gyro sensor, may be used to determine and correct the predicted route.

The wireless communication apparatus 530 is capable of exchanging state information related to the state of the own vehicle 50 and the state of the surrounding environment through wireless communication with an intelligent transport system 70. The wireless communication apparatus 530 is also capable of exchanging the state information through inter-vehicle communication with the other vehicle 60, and road-vehicle communication with a roadside radio equipment that is provided in a road facility.

The assistance information acquiring unit 500 may acquire some pieces of information related to the driving state of the own vehicle 50 using the state information acquired through such wireless communication. The various types of assistance information acquired by the assistance information acquiring unit 500 are transmitted to the automatic driving ECU 200.

In the present description, "automatic driving" refers to driving in which all of drive unit control, brake control, and steering angle control are automatically performed without the driver performing driving operations. Therefore, in automatic driving, an operation state of the drive unit, an operation state of the brake mechanism, and the steering angle of the wheels are automatically determined. "Manual driving" refers to driving in which the driver performs an operation (stepping on an accelerator pedal) for drive unit control, an operation (stepping on a brake pedal) for brake control, and an operation (rotation of a steering wheel) for steering angle control.

The automatic driving control unit 210 performs control for automatic driving of the own vehicle 50 using the various states recognized by the state recognizing unit 220. Specifically, the automatic driving control unit 210 transmits a drive indicator value to the drive unit control apparatus 310. The drive indicator value indicates the operation state of the drive unit (engine and motor).

The automatic driving control unit 210 also transmits a brake indicator value to the brake control apparatus 320. The brake indicator value indicates the operation state of the brake mechanism. The automatic driving control unit 210 also transmits a steering angle indicator value to the steering angle control apparatus 330. The steering angle indicator value indicates the steering angle of the wheels. The control apparatuses 310, 320, and 330 perform control of the respective mechanisms to be controlled based on the provided indicator values. For example, the various functions of the automatic driving control unit 210 can be implemented through artificial intelligence using machine learning such as deep learning.

The automatic driving control system 100 has numerous electronic apparatuses including the automatic driving ECU 200. The plurality of electronic apparatuses are connected to each other via an onboard network such as a controller area network (CAN).

Figure 2:
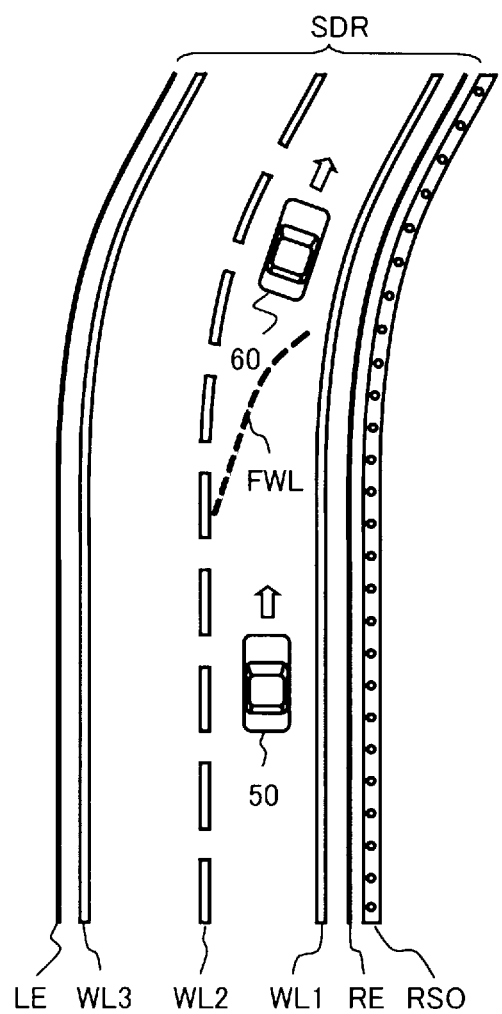
FIG. 2 is an explanatory diagram of an example of a plurality of objects associated with a travel road shape according to the first embodiment.

As shown in FIG. 2, when the own vehicle 50 travels along a route SDR, the object recognizing unit 222 can recognize a plurality of objects. Here, a left edge LE and a right edge RE of the road surface, travel road boundary lines WL1, WL2, and WL3, and a roadside object RSO are shown as the objects that can be recognized. The two travel road boundary lines WL1 and WL3 are solid white lines. The travel road boundary line WL2 in the center is a broken white line.

For example, the roadside object RSO is a guardrail. These objects can be recognized through use of images captured by the camera 412 and detection results from the radar 414. A preceding other vehicle 60 travels ahead of the own vehicle 50. The travel locus of the other vehicle 60 such as this can also be recognized through use of the images captured by the camera 412 and the detection results from the radar 414.

A false boundary line FWL that is easily erroneously recognized as a travel road boundary line is present on the road surface near the center travel road boundary line WL2. For example, the false boundary line FWL is a trace of a boundary line that had been previously drawn on the road surface or a line that is drawn on the road surface for some other reason. Hereafter, three objects, that is, the center travel road boundary line WL2, the travel locus of the other vehicle 60, and the roadside object RSO serve as examples of the objects to be used for recognition of the shape (travel road shape) of the travel road on which the own vehicle 50 travels.

A process for calculating the reliabilities of these three objects will be described hereafter. As the object used for determining the travel road shape, at least one of a plurality of types including the travel road boundary lines, the travel locus of another vehicle, and roadside objects is preferably recognized. A reason for this is that these three types of objects all have shapes that are associated with the shape (travel road shape) of the travel road on which the own vehicle 50 travels. In addition to the guardrail, a line on the left edge LE or the right edge RE of the road surface, or a curbstone on the shoulder of the road may be used as the roadside object RSO.

Figure 3:
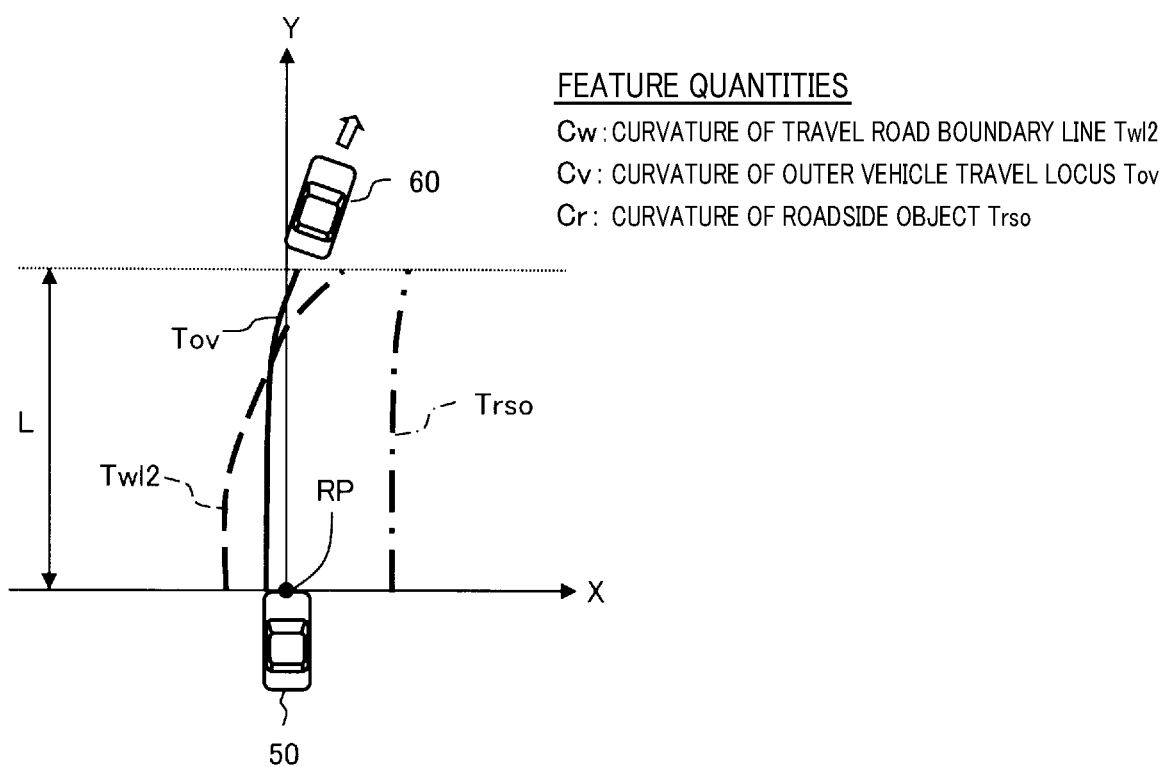
FIG. 3 is an explanatory diagram of the shapes and feature quantities of recognized objects according to the first embodiment.

A travel road boundary line Twl2, an other-vehicle travel locus Tov, and a roadside object Trso shown in FIG. 3 are the recognized objects recognized by the object recognizing unit 222. Here, the travel road boundary line Twl2 is drawn using a broken line. The other-vehicle travel locus Tov is drawn using a solid line. The roadside object Trso is drawn using a single-dot chain line. However, these lines are used for convenience of illustration. In actuality, the travel road boundary line Twl2, the other-vehicle travel locus Tov. and the roadside object Trso are each preferably recognized as a continuous solid line.

An erroneous recognition may be included among the recognized objects Twl2, Tov, and Trso. For example, the travel road boundary line Twl2 has a shape that significantly differs from the actual travel road boundary line WL2 in FIG. 2 as a result of the false boundary line FWL being erroneously recognized as a part of the travel road boundary line WL2. Various objects that are associated with the shape (travel road shape) of the travel road on which the own vehicle 50 travels may be used as the recognized object. For example, a line on the left edge or the right edge of the road surface may be used as the recognized object.

FIG. 3 shows a two-dimensional coordinate system in which a vehicle-width direction is an X axis and a direction perpendicular to the X axis is a Y axis, with a reference position RP of the own vehicle 50 as a point of origin. The vehicle-width direction X is also referred to as a "lateral direction." The shape of the recognized object is recognized as a two-dimensional shape on the XY coordinate system. According to the first embodiment, as feature quantities of the three recognized objects, shape parameters that indicate the shapes thereof are calculated. According to the first embodiment, a curvature is used as the feature quantity.

To calculate the respective curvatures Cw, Cv, and Cr of the three recognized objects Twl2, Tov, and Trso, a length L in the Y-axis direction of each of the three recognized objects Twl2, Tov, and Trso is preferably set to the same length. For example, the length L may coincide with the shortest length recognized by the object recognizing unit 222 among the lengths of the three recognized objects Twl2, Tov, and Trso.

The other vehicle travel locus Tov can only be recognized from the reference position RP of the own vehicle 50 to the rear end of the other vehicle 60. Thus, the length in the Y-axis direction of the other vehicle travel locus Tov is the shortest. Therefore, the length in the Y-axis direction of the other vehicle travel locus Tov can be used as the length L of the three recognized objects Twl2, Tov, and Trso used to calculate the curvatures. However, other values (such as a predetermined length of about 50 meters) may be used as the length L. For example, the curvatures Cw Cv, and Cr of the recognized objects Twl2, Tov, and Trso can be calculated by a least-squares method.

Figure 4:
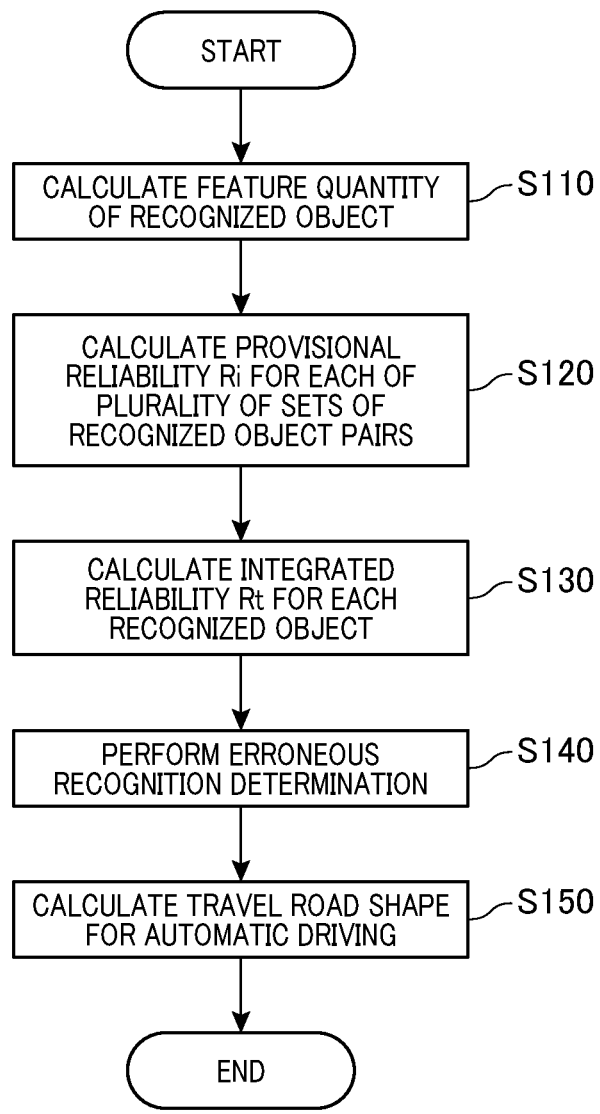
FIG. 4 is a flowchart of the steps for calculating a reliability (recognition reliability) of a recognized object.

As shown in FIG. 4, first, at step S110, the reliability calculating unit 230 calculates the curvatures Cw, Cv, and Cr as the feature quantities of the recognized objects Twl2, Tov, and Trso. Specifically, for example, the reliability calculating unit 230 adjusts the lengths of the recognized objects Twl2, Toy, and Trso recognized by the object recognizing unit 222 so as to be the same length L (FIG. 3). Then, the reliability calculating unit 230 calculates the respective curvatures Cw. Cv, and Cr of the recognized objects Twl2, Tov, and Trso using the least-squares method.

At step S120, the provisional reliability calculating unit 232 selects a plurality of pairs of recognized objects (also referred to as recognized object pairs) from the plurality of recognized objects Twl2, Tov, and Trso. The provisional reliability calculating unit 232 then calculates a provisional reliability (provisional recognition reliability) Ri for each recognized object pair.

According to the present embodiment, the three recognized objects Twl2, Tov, and Trso are used. Therefore, three recognized object pairs (Twl2, Tov), (Tov, Trso), and (Trso, Twl2) can be selected. To calculate the provisional reliabilities Ri, first, the provisional reliability calculating unit 232 calculates a difference ΔC in feature quantity regarding each of the three recognized object pairs (Twl2, Tov), (Tov, Trso), and (Trso. Twl2).

$$\Delta C(Twl2, Tov) = |Cw - Cv| \tag{1a}$$

$$\Delta C(Tov, Trso) = |Cv - Cr| \tag{1b}$$

$$\Delta C(Trso, Twl2) = |Cr - Cw| \tag{1c}$$

Here, ΔC(A, B) denotes the difference in feature quantity in the recognized object pair (A, B). Cw, Cv, and Cr respectively denote the feature quantities (curvatures) of the recognized objects Twl2, Tov, and Trso. Here, an absolute value provided in the right side in each of the expressions (1a) to (1c) is used as the difference ΔC in feature quantity.

In general, when the recognized object pairs are selected from an M-number (2≤M) of recognized objects, all of a maximum number $_MC_2$ of combinations including two recognized objects among the M-number of recognized objects may be selected. However, regarding the recognized objects that are paired with each individual recognized object, a plurality of recognized objects of a predetermined quantity (such as two or three) are preferably selected in order from the recognized object that is nearest in distance to the individual recognized object, among the other recognized objects. As a result of this latter configuration, the reliability of each individual recognized object can be more accurately calculated.

Figure 5:
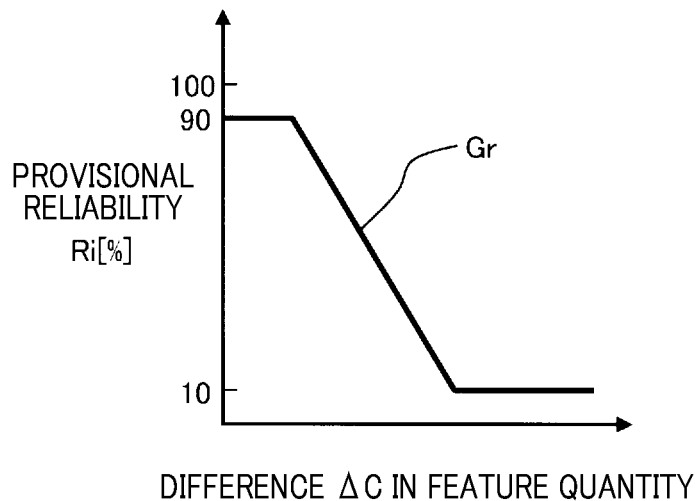
FIG. 5 is a graph of an example of a relationship between a difference in feature quantities and a provisional reliability (provisional recognition reliability)

As shown in FIG. 5, the provisional reliability Ri of each recognized object pair is determined based on the difference ΔC in feature quantity of the recognized object pair and a relationship Gr that is set in advance between the difference ΔC in feature quantity and the provisional reliability Ri. The relationship Gr is set such that the provisional reliability Ri decreases as the difference ΔC in feature quantity increases. The provisional reliability Ri is preferably set within a range exceeding 0% and less than 100%. In the example in FIG. 5, a maximum value of the provisional reliability Ri is 90% and a minimum value is 10%. However, these values are merely examples. The shape of the relationship Gr may be set to an arbitrary shape other than that in the example in FIG. 5. The relationship Gr such as this is prepared in advance as a function or a lookup table, and stored in the reliability calculating unit 230.

At step S130, the integrated reliability calculating unit 234 calculates an integrated reliability (integrated recognition reliability) Rt of each of the recognized objects Twl2, Tov, and Trso from the provisional reliabilities Ri of the plurality of recognized object pairs (Twl2, Tov), (Tov, Trso), and (Trso, Twl2). The integrated reliability Rt of each of the recognized objects Twl2, Tov, and Trso is preferably calculated through use of a predetermined function f(Ri). In the function f(Ri), the provisional reliability Ri of the recognized object pair including the recognized object is set as a variable. As the function f(Ri), any of the various functions such as those provided in the right side in expressions (2) to (4), below, can be used.

$$Rt = \Sigma Ri/N \quad (2)$$

$$Rt = (\Pi Ri)^{1/N} \quad (3)$$

$$Rt = \{\Sigma Ri^2/N\}^{1/2} \quad (4)$$

Here, in the expressions (2) to (4), N (2≤N) denotes the number of provisional reliabilities Ri. In the expressions (2) and (4). Σ denotes an operator for addition. In the expression (3), Π denotes an operator for multiplication. That is, the expression (2) is an arithmetic average of N provisional reliabilities Ri. The expression (3) is a geometric means of N provisional reliabilities Ri. The expression (4) is a root mean square of N provisional reliabilities Ri.

Furthermore, as the function f(Ri) for calculating the integrated reliability Rt, a function provided in the right side in expression (5), below, can also be used.

$$Rc = Ra \times Rb/\{Ra \times Rb + (1-Ra) \times (1-Rb)\} \quad (5)$$

Here, Ra denotes a first provisional reliability. Rb denotes a second provisional reliability. Rc denotes an integrated reliability integrating the two provisional reliabilities Ra and Rb. The expression (5) is applied in cases in which two provisional reliabilities are to be integrated.

In cases in which at least three provisional reliabilities are to be integrated, the calculation result Rc obtained through the above-described expression (5) regarding the first two provisional reliabilities is set as a new input value Ra. The third provisional reliability is set as Rb, and the calculation of the expression (5) is performed again. In cases in which at least four provisional reliabilities are to be integrated, the final integrated reliability Rt can be obtained by the expression (5) being cumulatively applied in a similar manner.

Figure 6:
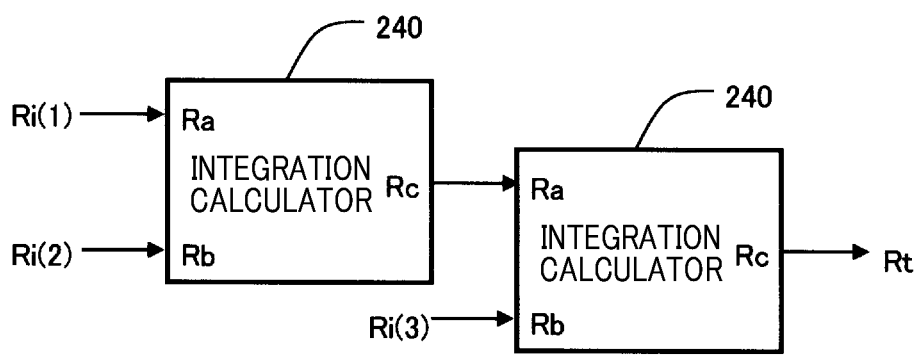
FIG. 6 is an explanatory diagram of an example of calculators that calculate an integrated reliability (integrated recognition reliability)

FIG. 6 shows a configuration example of a calculator that calculates the integrated reliability Rt from three provisional reliabilities Ri(1) to Ri(3) based on the above-described expression (5). Here, two integration calculators 240 that perform the calculation of the expression (5) are used in combination in a cascading manner. The calculation based on the expression (5) and FIG. 6 corresponds to a calculation in which the integrated reliability Rt is determined through integration by the provisional reliabilities Ri being multiplied based on the framework of Bayesian inference.

As the function f(Ri) for calculating the integrated reliability Rt from the provisional reliabilities Ri, a function other than those in the expressions (2) to (5) may be used. However, the function f(Ri) is preferably a function in which the value of the function increases as each provisional reliability Ri increases.

FIG. 7 shows the results of the calculation of the integrated reliabilities Rt of the recognized objects Twl2, Tov, and Trso using the calculators in FIG. 6. For example, as the provisional reliabilities Ri of the travel road boundary line Twl2, a provisional reliability Ri(Twl2,Tov) of the pair of the travel road boundary line Twl2 and the other vehicle travel locus Tov, and a provisional reliability Ri(Trso,Twl2) of the pair composed the travel road boundary line Twl2 and the roadside object Trso are present. Therefore, the integrated reliability Rt of the travel road boundary line Twl2 is calculated from the two provisional reliabilities Ri(Twl2, Tov) and Ri(Trso,Twl2).

The integrated reliabilities Rt of the other vehicle travel locus Tov and the roadside object Trso are also calculated in a similar manner. In the example in FIG. 7, the values of the provisional reliabilities Ri of the two sets of recognized object pairs including the travel road boundary line Twl2 are both low, at 20% and 15%. Therefore, the integrated reliability Rt of the travel road boundary line Twl2 is 4% and a value that is lower than the integrated reliabilities Rt of the other recognized objects. Therefore, in this example, a determination that erroneous recognition is highly likely to be present in the travel road boundary line Twl2, among the plurality of recognized objects, is made.

At step S140 in FIG. 4, the erroneous recognition determining unit 236 determines the recognized object in which erroneous recognition is highly likely to be present based on the integrated reliabilities Rt of the plurality of recognized objects Twl2, Tov, and Trso. For example, as the determination method, any of several methods such as those below can be used.

<Erroneous Recognition Determination Method 1>

Among an M-number (2≤M) of recognized objects, an m-number (1≤m<M) of recognized objects selected in order from the recognized object that has the lowest integrated reliability Rt is determined to be highly likely to include erroneous recognition.

<Erroneous Recognition Determination Method 2>

The recognized object of which the integrated reliability Rt is equal to or less than a predetermined threshold is determined to be highly likely to include erroneous recognition.

In the example in FIG. 7, when m is set to 1 in the erroneous recognition determination method 1, erroneous recognition is determined to be highly likely to be present in the travel road boundary line Twl2. In the erroneous recognition determination method 2, for example, when the threshold is set to a value ranging from 0.1 to 2, erroneous recognition is determined to be highly likely to be present in the travel road boundary line Twl2.

At step S150, the travel road shape calculating unit 224 calculates the travel road shape that is used for driving control of the own vehicle 50, using the integrated reliabilities Rt. Specifically, for example, the travel road shape calculating unit 224 calculates a travel road shape parameter Pm that indicates the travel road shape based on an expression below:

$$Pm = \Sigma w_j \times P_j \quad (6)$$

Here, $P_j$ (1≤j≤M) denotes a shape parameter of each of the M-number (2≤M) of recognized objects recognized by the object recognizing unit 222, and $w_j$ denotes weight.

For example, as the shape parameter $P_j$, a parameter (such as curvature) that is the same as the feature quantity calculated at step S110 in FIG. 4 can be used. Alternatively, as the shape parameter $P_j$, a parameter (such as a rate of change in curvature or a lateral-direction offset, described hereafter) other than the feature quantity calculated at step S110 may be used.

The weight $w_j$ is preferably a value that has a positive correlation with the integrated reliability Rt of each recognized object. For example, as the weight $w_j$, a value obtained by the integrated reliability Rt being multiplied by a fixed coefficient α (α being a positive real number) may be used. As a result, the road shape parameter Pm is calculated using a larger weight as the integrated reliability Rt of the recognized object increases. Therefore, a more reliable road shape parameter can be obtained.

Regarding the recognized object that is determined to be highly likely to include erroneous recognition by the erroneous recognition determining unit 236, the weight $w_j$ in the above-described expression (6) may be set to zero. The weight $w_j$ being set to zero is equivalent to the recognized object being excluded. In the expression (6), cases in which the weight $w_j$ that has a positive correlation with the integrated reliability Rt is used include cases in which the recognized object that is likely to include erroneous recognition is not excluded. In the latter cases, the erroneous recognition determining unit 236 may be omitted.

The travel road shape calculating unit 224 calculates the travel road shape using the travel road shape parameter Pm obtained as described above. Specifically, the travel road shape calculating unit 224 calculates the curvature of the shape (travel road shape) of the travel road on which the own vehicle 50 travels using the travel road shape parameter Pm. The automatic driving control unit 210 performs automatic driving of the own vehicle 50 using the travel road shape calculated in this manner.

As described above, according to the first embodiment, a plurality of recognized object pairs are selected. The difference in feature quantity between the recognized objects in each recognized object pair is determined. The reliability that decreases as the difference in feature quantity increases is calculated as the provisional reliability Ri of each recognized object pair.

In addition, the integrated reliability Rt of each recognized object is calculated based on the provisional reliabilities Ri of the plurality of recognized object pairs. Through use of the integrated reliabilities Rt, the recognized object that is highly likely to include erroneous recognition can be determined from among the plurality of recognized objects.

In addition, according to the first embodiment, the shapes of the plurality of recognized objects including at least one of a plurality of types including the travel road boundary lines, the other vehicle travel locus, and the roadside objects is calculated as the feature quantities. Therefore, the provisional reliability Ri decreases as the difference in shape among the recognized objects increases. Consequently, the integrated reliability Rt of each recognized object can be accurately calculated.

B. Second Embodiment

As shown in FIG. 8, according to a second embodiment, respective lateral-direction offsets Xw, Xv, and Xr are used as the feature quantities of the recognized objects Twl2. Tov, and Trso. The configuration of the system and the processing steps according to the second embodiment are identical to the configuration of the system in FIG. 1 and the processing steps in FIG. 4 according to the first embodiment.

The lateral-direction offsets Xw, Xv, and Xr are each a difference between a lateral-direction coordinate value (X-axis coordinate value) at a point of origin of the recognized object and the lateral-direction coordinate value at an end point. The lateral-direction offset corresponds to a value obtained through integration of a localized curvature of the shape of the recognized object.

Therefore, a following advantage can be achieved through use of the lateral-direction offset. That is, the likelihood of erroneous recognition being present in the recognized object can be more stably determined, compared to cases in which the curvature is used. Values other than the curvature and the latera-direction offset may be used as the feature quantity of the recognized object. However, the feature quantity is preferably a shape parameter that indicates the shape of the recognized object.

C. Third Embodiment

As shown in FIG. 9, according to a third embodiment, a case in which the object recognizing unit 222 erroneously recognizes a travel road boundary line WLx of an opposing traffic lane on the outer side of the route SDR of the own vehicle 50 is presumed. The configuration of the system and the processing steps according to the third embodiment are identical to the configuration of the system in FIG. 1 and the processing steps in FIG. 4 according to the first embodiment.

Figure 10:
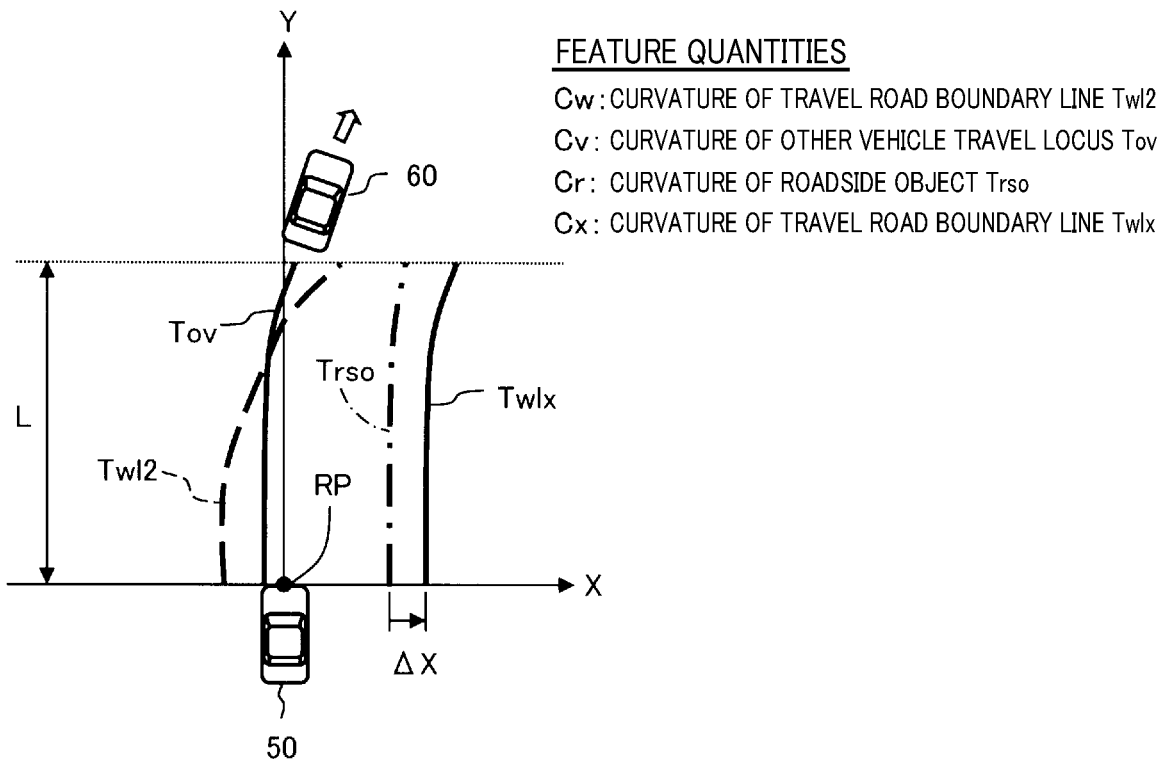
FIG. 10 is an explanatory diagram of the shapes and feature quantities of the recognized objects according to the third embodiment.

As shown in FIG. 10, as a recognized object according to the third embodiment, a travel road boundary line Twlx is added to the recognized objects according to the first embodiment shown in FIG. 3. The travel road boundary line Twlx is positioned further towards the outer side than the roadside object Trso is.

In other words, a value ΔX obtained by the lateral-direction coordinate value at the point of origin of the roadside object Trso being subtracted from the lateral-direction coordinate value at the point of origin of the travel road boundary line Twlx is a positive value. In such cases, the provisional reliability Ri related to the recognized object pair of the travel road boundary line Twlx and the roadside object Trso is preferably set to a value that is less than a predetermined value.

Figure 11:
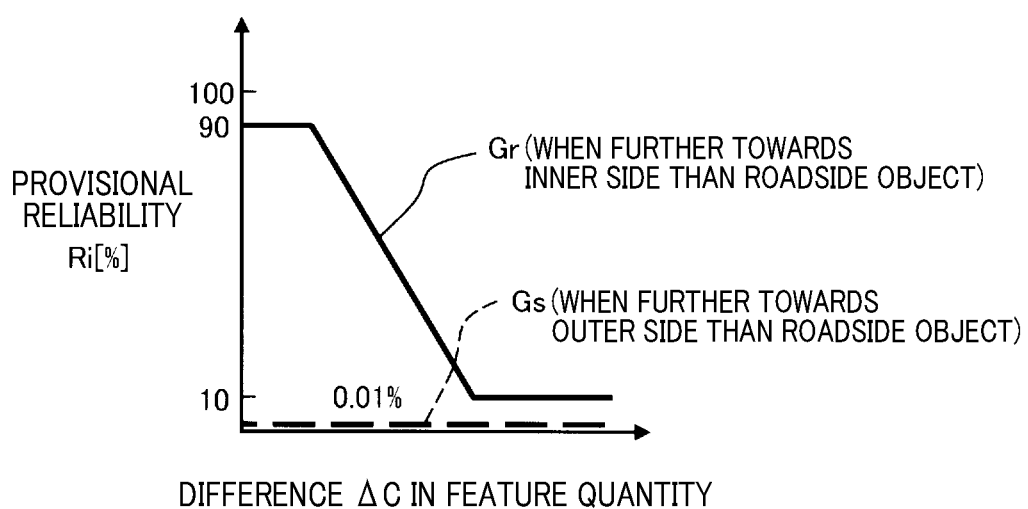
FIG. 11 is a graph of an example of a relationship between a lateral-direction position of a travel road boundary line and the provisional reliability according to the third embodiment.

As shown in FIG. 11, the provisional reliability Ri of the recognized object pair of the travel road boundary line Twlx that is positioned further towards the outer side than the roadside object Trso and the roadside object Trso are is determined through use of a relationship Gs in which the provisional reliability Ri is set to a value that is lower than a predetermined value.

For example, as the predetermined value, a value that is equal to or less than a minimum value (10% in FIG. 11) of the provisional reliability Ri of the recognized object pair of a travel road boundary line that is positioned further towards the inner side than the roadside object Trso and the roadside object Trso may be used.

As a result, the provisional reliability Ri of the recognized object pair including the travel road boundary line Twlx that is positioned further towards the outer side than the roadside object Trso is can be set to a value that is less than the minimum value of the provisional reliability Ri of the recognized object pair including the travel road boundary line that is positioned further towards the inner side than the roadside object Trso.

In the example in FIG. 11, the provisional reliability Ri in the relationship Gs is set to a fixed value (specifically, 0.01%) that is unrelated to the difference ΔC in feature quantity. Meanwhile, in cases in which the travel road boundary line Twlx is positioned further towards the inner side than the roadside object Trso, the provisional reliability Ri can be calculated based on the same relationship Gr as that according to the first embodiment shown in FIG. 5.

As described above, in cases in which the travel road boundary line Twlx is positioned further towards the outer side than the roadside object Trso, the provisional reliability Ri of the travel road boundary line Twlx and the roadside object Trso is set to a value that is less than a predetermined value. As a result, the integrated reliability Rt of the travel road boundary line Rt is set to a low value.

Consequently, a determination that erroneous recognition is highly likely to be present in the travel road boundary line Twlx that is positioned further towards the outer side than the roadside object Trso can be made. Here, "further towards the outer side than the roadside object Trso" refers to a position that is farther from the own vehicle 50 than the roadside object Trso. In addition, "further towards the inner side than the roadside object Trso" refers to a position that is closer to the own vehicle 50 than the roadside object Trso.

In the description above, regarding the travel road boundary line Twlx that is positioned further towards the outer side than the roadside object Trso, the value of the provisional reliability Ri of the recognized object pair of the travel road boundary line Twlx and the roadside object Trso is set based on the relationship Gs in FIG. 11. However, the values of the provisional reliabilities Ri of the recognized object pairs of recognized objects other than the travel road boundary line Twlx and the roadside object Trso may also be similarly set based on the above-described relationship Gs (in which the provisional reliability Ri is set to a value that is equal to or less than a predetermined value).

D. Fourth Embodiment

Figure 12:
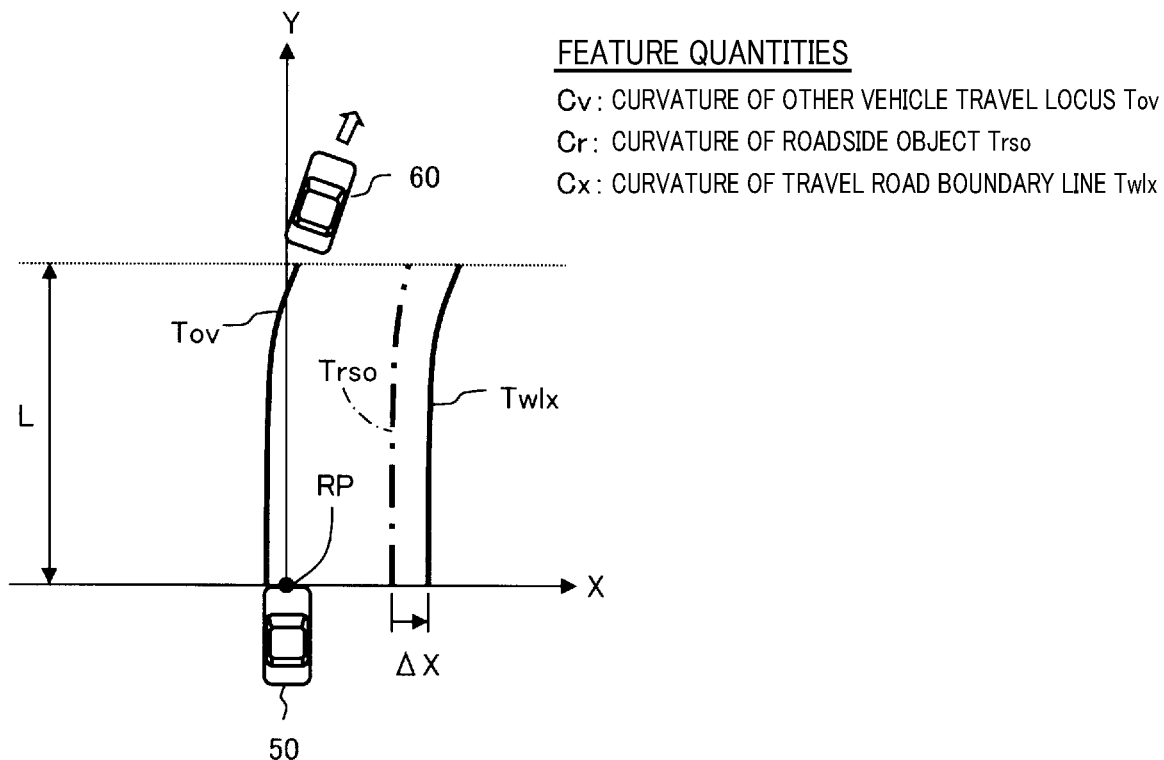
FIG. 12 is an explanatory diagram of the shapes of the recognized objects according to a fourth embodiment.

As shown in FIG. 12, according to a fourth embodiment, a case in which the travel road boundary line Twl2 shown in FIG. 10 is omitted, and the roadside object Trso, the other vehicle travel locus Toy, and the travel road boundary line Twlx positioned on the outer side of the roadside object Trso are recognized is presumed. The configuration of the system and the processing steps according to the fourth embodiment are identical to the configuration of the system in FIG. 1 and the processing steps in FIG. 4 according to the first embodiment.

Figure 13:
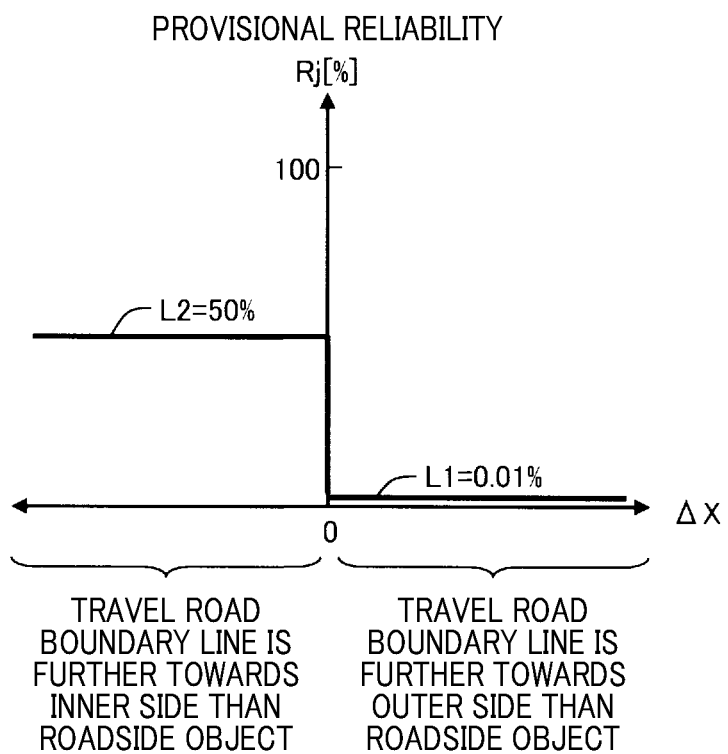
FIG. 13 is a graph of an example of a relationship between the lateral-direction position of the travel road boundary line and the provisional reliability according to the fourth embodiment.

As shown in FIG. 13, according to the fourth embodiment, when the travel road boundary line Twlx is positioned further towards the outer side than the roadside object Trso, a provisional reliability Rj of the recognized object pair of the travel road boundary line Twlx and the roadside object Trso is set to a first value L1. When the travel road boundary line Twlx is positioned further towards the inner side than the roadside object Trso, the provisional reliability Rj is set to a second value L2 that is greater than the first value L1. For example, a value that is similar to the value used in the relationship Gs shown in FIG. 11 according to the third embodiment may be used as the first value L1. Meanwhile, the second value L2 can be set to an arbitrary value that is greater than the first value L1.

In the example in FIG. 13, the first value L1 is set to 0.01% and the second value L2 is set to 50%. In this manner, according to the fourth embodiment, when the travel road boundary line Twlx is positioned further towards the outer side than the roadside object Trso, the provisional reliability Rj of the recognized object pair of the travel road boundary line Twlx and the roadside object Trso is set to a value that is less than the value when the travel road boundary line Twlx is positioned further towards the inner side than the roadside object Trso. This point is understood to be a feature that is also shared with the provisional reliability Ri shown in FIG. 11 according to the third embodiment.

The provisional reliability Rj that is set based on whether the travel road boundary line is positioned further towards the outer side or the inner side than the roadside object can be considered to be a provisional reliability in which the lateral-direction coordinate values X at the points of origin of the travel road boundary line and the roadside object are used as the feature quantities, and the provisional reliability is set based on a difference ΔX between the lateral-direction coordinate values X.

The provisional reliability Rj may be used independently from the provisional reliability Ri (FIG. 5) used according to the first embodiment. For example, as the provisional reliability of the recognized object pair of the travel road boundary line and the roadside object, only either of a first type of provisional reliability Ri (FIG. 5) set based on the difference ΔC between first feature quantities and a second type of provisional reliability Rj (FIG. 13) set based on the difference ΔX between second feature quantities, or both, may be used.

The second value L2 is set to 50% in FIG. 13 for the following reason. That is, in cases in which the calculation based on the above-described expression (5) is used, when either (such as Rb) of the two input values Ra and Rb is 50%, the calculation result Rc is the same value as the other input value (such as Ra). That is, when the second type of provisional reliability Rj is set to 50% in cases in which the travel road boundary line Twlx is positioned further towards the inner side than the roadside object Trso, the value of the integrated reliability Rt does not change even when the provisional reliability Rj is used.

Therefore, the provisional reliability Rj can be combined with the first type of provisional reliability Ri set based on the relationship Gr shown in FIG. 5, and the integrated reliability Rt can be accurately determined. However, other functions such as those in the above-described expressions (2) to (4) can also be used instead of the expression (5).

As shown in FIG. 14, according to the fourth embodiment, the values of both the first type of provisional reliability Ri (FIG. 5) and the second type of provisional reliability Rj (FIG. 13) are used as the provisional reliability of the recognized object pair of the travel road boundary line Twlx and the roadside object Trso. In this case, when the integrated reliabilities Rt are calculated using the above-described calculators in FIG. 6, the integrated reliabilities Rt of the travel road boundary line Twlx and the roadside object Trso are both 0.3%. Therefore, erroneous recognition is determined to be highly likely to be present in the travel road boundary line Twlx and the roadside object Trso.

In the example in FIG. 14, the second type of provisional reliability Rj of the recognized object pair of the travel road boundary line Twlx and the roadside object Trso is used in the calculation of both the integrated reliability Rt of the travel road boundary line Twlx and the integrated reliability Rt of the roadside object Trso. However, the second type of provisional reliability Rj of the recognized object pair of the travel road boundary line Twlx and the roadside object Trso may be used only in the calculation of the integrated reliability Rt of the travel road boundary line Twlx.

As described above, according to the third embodiment and the fourth embodiment, the provisional reliability of the recognized object pair including the travel road boundary line that is positioned further towards the outer side than the roadside object Trso is set to a value that is less than that of the provisional reliability of the recognized object pair including the travel road boundary line that is positioned further towards the inner side than the roadside object Trso.

Therefore, the integrated reliabilities of the recognized objects are set to low values. Consequently, erroneous recognition can be determined to be highly likely to be present in the travel road boundary line Twlx that is positioned further towards the outer side than the roadside object Trso.

E. Fifth Embodiment

Figure 15:
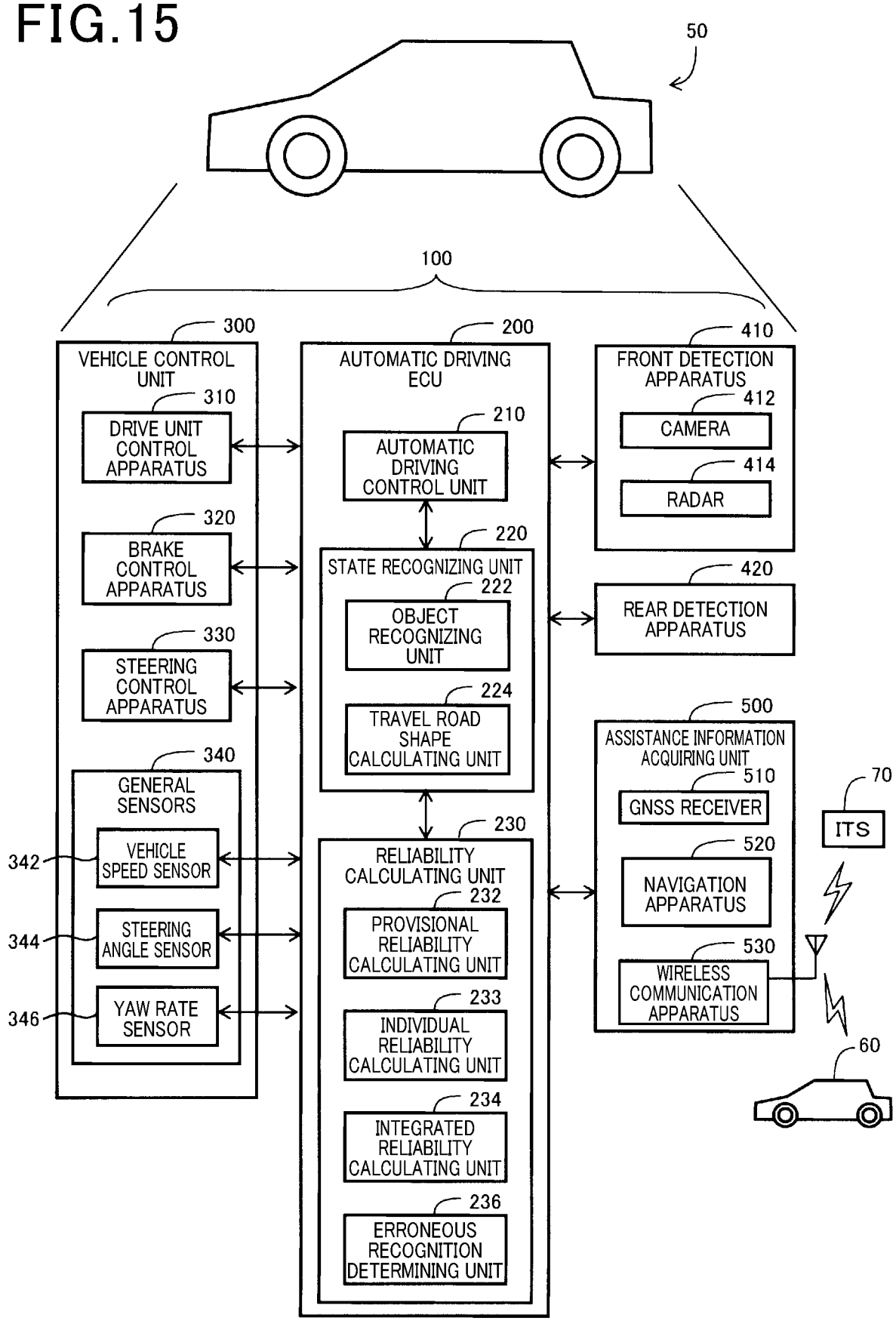
FIG. 15 is a block diagram of a configuration of an automatic driving control system according to a fifth embodiment.

As shown in FIG. 15, the automatic driving control system 100 according to a fifth embodiment differs from that according to the first embodiment in that an individual reliability calculating unit 233 is added to the reliability calculating unit 230. Other configurations are identical to those according to the first embodiment. The individual reliability calculating unit 233 calculates an individual reliability of each recognized object using a method differing from that used by the provisional reliability calculating unit 232.

For example, an individual reliability is an indicator that indicates the reliability of the feature quantity itself of the recognized object. An indicator that indicates a stability of the feature quantity over time may be used as the individual reliability.

Figure 16:
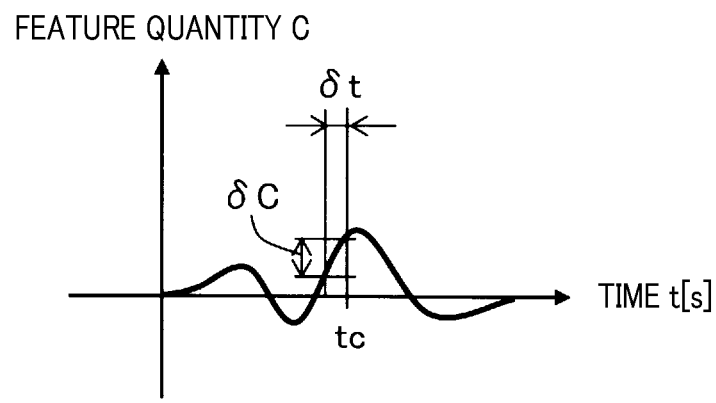
FIG. 16 is a graph of an example of a time rate of change of the feature quantity according to the fifth embodiment.

As shown in FIG. 16, a feature quantity C of the recognized object ordinarily changes over time. At this time, an amount of change δC in the feature quantity C during a predetermined time interval δt up to a current time tc can be measured. In addition, a value δC/δt obtained by the amount of change δC being divided by the time interval δt can be calculated as a time rate of change of the feature quantity C. The value of the time interval δt is experimentally or experientially set.

Figure 17:
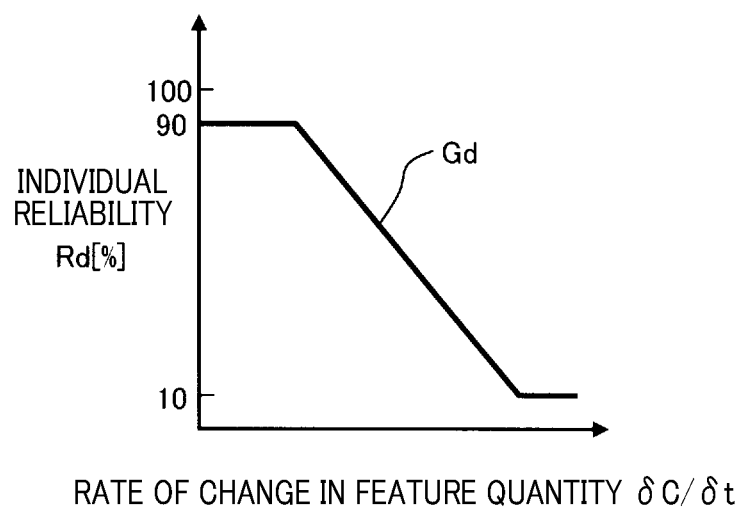
FIG. 17 is a graph of an example of a relationship between the time rate of change of the feature quantity and an individual reliability.

In the example shown in FIG. 17, an individual reliability Rd of the recognized object is determined based on a relationship Gd that is set in advance between the time rate of change δC/δt of the feature quantity C and the individual reliability Rd. Specifically, the individual reliability Rd is set to a lower value as the time rate of change δC/δt of the feature quantity C increases.

The integrated reliability calculating unit 234 can calculate the integrated reliability Rt of each recognized object using the individual reliability Rd and the provisional reliability Ri described according to the embodiments above. For example, in cases in which any of the above-described expressions (2) to (4) is used to calculate the integrated reliability Rt, the calculation of each expression can be performed with the individual reliability Rd serving as a type of provisional reliability Ri.

As described above, the individual reliability Rd of each recognized object is calculated by a method differing from that of the provisional reliability Ri. As a result, the integrated reliability Rt of each recognized object can be calculated based on the provisional reliability Ri and the individual reliability Rd. Consequently, the recognized object that is highly likely to include erroneous recognition among the plurality of recognized objects can be more accurately determined.

F. Sixth Embodiment

Figure 18A:
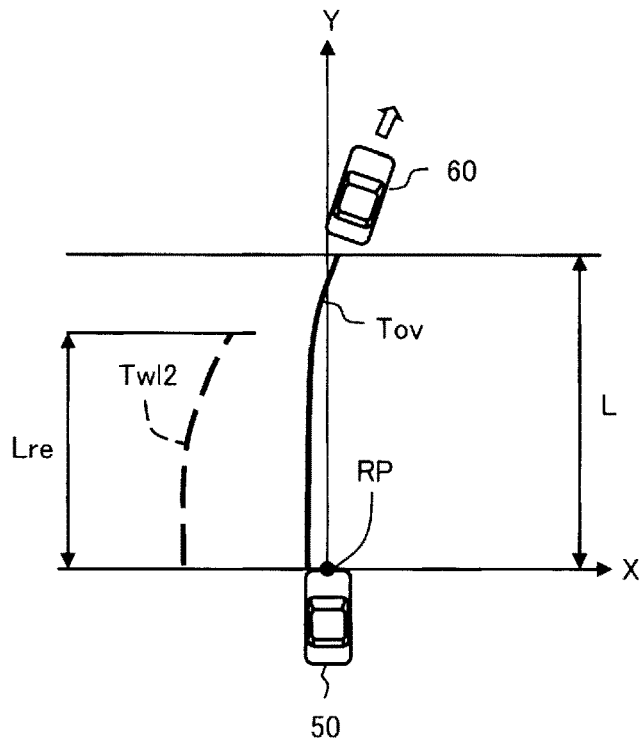
FIG. 18A is an explanatory diagram of a case in which a recognized object meets extrapolation conditions according to a sixth embodiment.
Figure 18B:
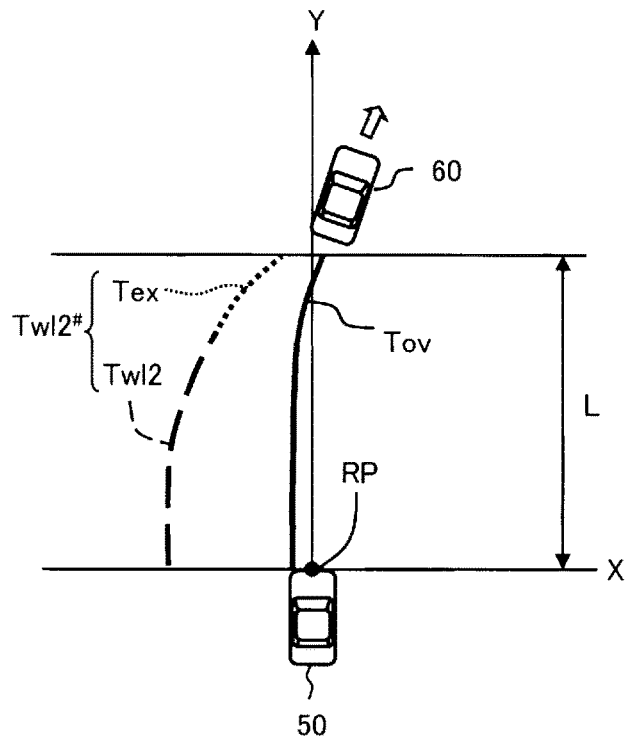
FIG. 18B is an explanatory diagram of a state in which the recognized object is extrapolated according to the sixth embodiment.

As shown in FIG. 18A and FIG. 18B, according to a sixth embodiment, in cases in which the travel road boundary line Twl2 that is a recognized object meets extrapolation conditions, the travel road boundary line Twl2 is extrapolated and the feature quantity thereof is calculated.

According to the sixth embodiment, the extrapolation conditions of the travel road boundary line Twl2 include the two conditions below.

<Condition A1> The provisional reliability Ri of the other recognized object (other vehicle travel locus Tov) composing the recognized object pair is being calculated.

<Condition A2> The other recognized object (other vehicle travel locus Tov) composing the recognized object pair reaches farther than the travel road boundary line Twl2.

In condition A1, "the provisional reliability Ri of the other recognized object (other vehicle travel locus Tov) is being calculated" refers to a case in which the provisional reliability Ri to be used to calculate the integrated reliability Rt of the other recognized object is being calculated. In addition, condition A2 refers to a length Lre in the Y-axis direction of the travel road boundary line Twl2 being shorter than that of the other vehicle travel locus Tov. When both conditions A1 and A2 are met regarding one recognized object (travel road boundary line Twl2) composing the recognized object pair, the one recognized object is extrapolated and the feature quantity thereof is calculated when the provisional reliability Ri of the other recognized object (other vehicle travel locus Tov) is calculated.

As shown in FIG. 18B, when the travel road boundary line Twl2 is extrapolated, the length L of a travel road boundary line Twl2# after extrapolation is in a state matching the length L of the other vehicle travel locus Tov. In other words, the travel road boundary line Twl2 is extrapolated to a distance equal to the distance reached by the other vehicle travel locus Tov.

An extrapolation portion Tex of the travel road boundary line Twl2# can be obtained through extrapolation using an approximate curve of the travel road boundary line Twl2 before extrapolation. For example, when the approximate curve of the travel road boundary line Twl2 is expressed by an n-th degree equation (n being an integer of 2 or greater), the travel road boundary line Twl2 can be extrapolated in the Y-axis direction using the n-th degree equation. When n=3, the approximate curve is expressed by a following cubic equation.

$$X = aY^3 + bY^2 + cY + d \tag{7}$$

Here, X denotes the position in the X-axis direction, Y denotes the position in the Y-axis direction, and a to d denote coefficients.

The lengths L of the travel road boundary line Twl2# after extrapolation and the other vehicle travel locus Tov are equal. The respective feature quantities are calculated from the curves over this length L. As the feature quantity, a shape parameter (such as the curvature or the lateral-direction offset) that indicates the shapes of the recognized objects Twl2# and Tov may be used in a manner similar to that according to the above-described embodiments.

When the travel road boundary line Twl2 is extrapolated, the shape parameter calculated through use of the travel road boundary line Twl2# after extrapolation and the provisional reliability Ri calculated through use of the shape parameter may be values deviating from true values. For example, when the one recognized object is extrapolated at a location in which the travel road shape significantly changes, such as at an entrance or an exit of a curve, the shapes of the recognized object pair do not match. The reliability of the recognized object pair decreases. Therefore, according to the sixth embodiment, the provisional reliability Ri is calculated taking this point into consideration.

As shown in FIG. 19, according to the sixth embodiment, when the provisional reliability Ri of the other vehicle travel locus Tov is calculated, the relationship Gr between the difference ΔC in feature quantity of the recognized object pair and the provisional reliability Ri is corrected from the relationship in FIG. 5 described according to the first embodiment. The original relationships Gr and Gr0 are such that, when the difference ΔC in feature quantity is equal to a predetermined value ΔCth, the provisional reliability Ri is 50%.

According to the sixth embodiment, in cases in which the one recognized object of the recognized object pair is extrapolated, the provisional reliability Ri is set such that, when the difference ΔC in feature quantity is greater than the value ΔCth, the provisional reliability Ri becomes closer to 50% as an extrapolation distance (L−Lre) increases. The value ΔCth is also referred to, hereafter, as a "difference threshold ΔCth."

When the extrapolation distance (L−Lre) increases when the difference ΔC in feature quantity is greater than the difference threshold ΔCth, the original relationship Gr0 changes to any of relationships Gr1, Gr2, and Gr3 in which the provisional reliability Ri becomes a value that is closer to 50%. As a result, in cases in which the extrapolation distance (L−Lre) increases and the shapes of the recognized object pair no longer match, the provisional reliability Ri can be brought closer to a value (50%) that does not affect the integrated reliability Rt.

When the difference ΔC in feature quantity is equal to or less than the difference threshold ΔCth, the likelihood of the shapes of the recognized object pair being appropriately recognized is high. Therefore, the provisional reliability Ri is preferably not corrected.

In the example in FIG. 19, any one of the plurality of discrete relationships Gr0, Gr1, Gr2, and Gr3 is selected and used based on the extrapolation distance (L−Le). However, the provisional reliability Ri may be continuously changed based on the extrapolation distance (L−Le). In addition, either of the original relationship Gr0 and the relationship Gr3 in which a specific value (threshold value) (50%) is indicated when the difference ΔC in feature quantity is greater than the difference threshold ΔCth may be selected and used. In this case, the relationship Gr3 is preferably selected when the extrapolation distance (L−Le) is equal to or greater than a predetermined upper-limited value.

As described according to the first embodiment, in cases in which the above-described expression (5) is used as the function f(Ri) for calculating the integrated reliability Rt, when one provisional reliability Ra of the two provisional reliabilities Ra and Rb substituted in the right side of the expression (5) is 50%, the value Rc in the left side of the expression (5) becomes a value equal to the other provisional reliability Rb.

Therefore, as shown in FIG. 19, in cases in which the difference ΔC in the shape parameter that serves as the feature quantity is greater than the predetermined difference threshold ΔCth, when the provisional reliability Ri is set so as to become closer to the specific value (50%) when the extrapolation distance (L−Le) is longer, compared to when the extrapolation distance (L−Le) is shorter, the effect of the provisional reliability Ri on the integrated reliability Rt can be reduced. As a result, the integrated reliability Rt of the other vehicle travel locus Tov can be more accurately determined.

In the relationship Gr3 after the change in FIG. 19, the provisional reliability Ri is equal to 50% that is the specific value. Therefore, the provisional reliability Ri does not affect the integrated reliability Rt of the other vehicle travel locus Tov. As a result, the provisional reliability Rt does not need to be calculated when the extrapolation distance (L−Le) of the travel road boundary line Twl2 exceeds the predetermined upper-limit value.

A function other than the above-described expression (5) may be used as the function for calculating the integrated reliability Rt. However, a function that is configured such that the provisional reliability Ri does not affect the value of the integrated reliability Rt when the provisional reliability Ri is set to a specific value is preferably used. As such a function, for example, a function in which Ra and Rb in the expression (5) is replaced with (Ra−K) and (Rb−K) (where K is a constant) or the function in the above-described expression (3) may be used. In the function in the expression (3), the specific value is 1.

As shown in FIG. 20, when the travel road boundary line Twl2 is extrapolated when the provisional reliability Ri of the other vehicle travel locus Tov is calculated, numeric values to which an asterisk "*" is attached in FIG. 20 are changed from the numeric values in the example in FIG. 7. Specifically, in the row indicating the calculation of the integrated reliability Rt of the other vehicle travel locus Tov, the value of the provisional reliability Ri of the recognized object pair of the other vehicle travel locus Tov and the travel road boundary line Twl2 changes from 0.20 in FIG. 7 to 0.50.

In addition, the value of the integrated reliability Rt of the other vehicle travel locus Tov changes from 0.59 in FIG. 7 to 0.85. The other numeric values are identical to those in FIG. 7. For example, when the provisional reliability Ri of the travel road boundary line Twl2 is calculated using the recognized object pair Tov and Twl2 shown in FIG. 18A, the other recognized object Tov is not extrapolated. Therefore, the value of the provisional reliability Ri of the recognized object pair Tov and Twl2 does not change.

The change in the setting of the provisional reliability Ri described with reference to FIG. 19 may not be performed even when the recognized object is extrapolated. However, should the change in setting of the provisional reliability Ri described with reference to FIG. 19 be performed, in cases in which the shape of the recognized object significantly changes as a result of extrapolation, an advantage is achieved in that the integrated reliability Rt can be more accurately determined.

As described above, according to the sixth embodiment, when the extrapolation conditions including the above-described conditions A1 and A2 are met regarding the recognized object pair including a first recognized object Tov and a second recognized object Twl2, the second recognized object Twl2 is extrapolated and the shape parameter is calculated. As a result, the provisional reliability Ri and the integrated reliability Rt of the first recognized object Tov can be more accurately determined.

G: Seventh Embodiment

Figure 21A:
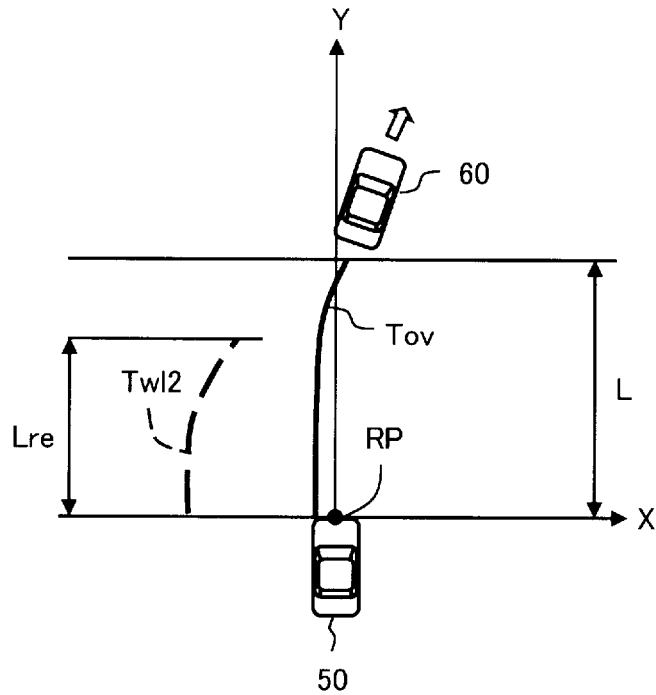
FIG. 21A is an explanatory diagram of a case in which a recognized object meets the extrapolation conditions according to a seventh embodiment.
Figure 21B:
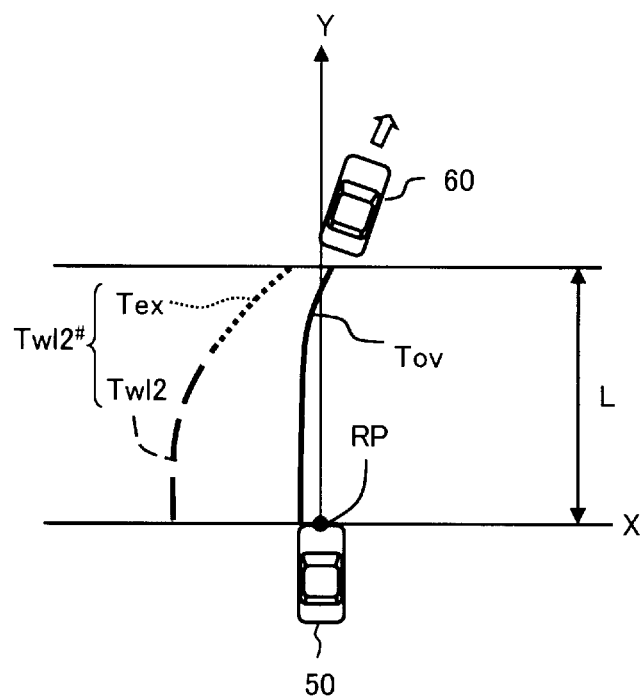
FIG. 21B is a state in which the recognized object is extrapolated according to the seventh embodiment.

As shown in FIG. 21A and FIG. 21B, according to a seventh embodiment as well, in cases in which the travel road boundary line Twl2 that is a recognized object meets extrapolation conditions, the travel road boundary line Twl2 is extrapolated and the feature quantity thereof is calculated, in a manner similar to that according to the sixth embodiment. The extrapolation conditions are identical to those according to the sixth embodiment.

The seventh embodiment differs from the sixth embodiment in that the recognition distance Lre (length in the Y-axis direction) of the travel road boundary line Twl2 before extrapolation is taken into consideration when the provisional reliability Ri of the other vehicle travel locus Tov is calculated. The recognition distance Lre of the travel road boundary line Twl2 in FIG. 21A is shorter than that in FIG. 18A. When the recognition distance Lre is short, extrapolation accuracy is lower than that when the recognition distance Lre is long. Therefore, according to the seventh embodiment, the provisional reliability Ri is calculated taking this point into consideration.

Figure 22:
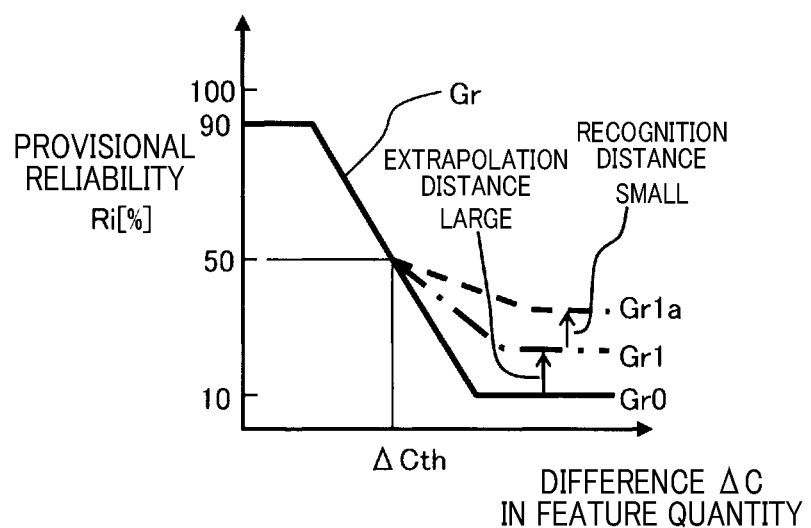
FIG. 22 is a graph of an example of a relationship between the difference in feature quantities and the provisional reliability according to the seventh embodiment.

As shown in FIG. 22, according to the seventh embodiment, when the provisional reliability Ri of the other vehicle travel locus Tov is calculated, the relationship Gr between the difference ΔC in feature quantity of the recognized object pair and the provisional reliability Ri is further corrected from the relationship in FIG. 19 described according to the sixth embodiment based on the recognition distance Lre of the travel road boundary line Twl2 before extrapolation.

In the example in FIG. 11, in a manner similar to that according to the sixth embodiment, a correction from the original relationship Gr0 to the relationship Gr1 in which the provisional reliability Ri is closer to 50% is made based on the extrapolation distance (L−Lre) of the travel road boundary line Twl2. Furthermore, a correction to a relationship Gr1a in which the provisional reliability Ri is even closer to 50% is made based on the recognition distance Lre of the travel road boundary line Twl2 before extrapolation.

In other words, when the difference ΔC in the shape parameter that serves as the feature quantity is greater than the predetermined difference threshold ΔCth, the provisional reliability Ri be set so as to become closer to a specific value (50%) when the recognition distance Lre of the travel road boundary line Twl2 is shorter, compared to when the recognition distance Lre is longer. As a result, the provisional reliability Ri and the integrated reliability Rt of the other vehicle travel locus Tov can be more accurately determined.

The provisional reliability Ri may not be calculated when the recognition distance Lre of the travel road boundary line Twl2 is less than a predetermined lower-limit value.

In addition, according to the seventh embodiment, the provisional reliability Ri of the other vehicle travel locus Tov is changed taking into consideration both the extrapolation distance (L−Lre) and the recognition distance (Lre) of the travel road boundary line Twl2. However, the provisional reliability Ri of the other vehicle travel locus Tov may be changed taking into consideration only the recognition distance Lre, without taking into consideration the extrapolation distance (L−Lre).

As described above, according to the seventh embodiment, in cases in which the second recognized object Twl2 of the recognized objects Tov and Twl2 is extrapolated and the difference ΔC between the shape parameters of the first recognized object Tov and the second recognized object Twl2 is greater than the predetermined difference threshold ΔCth, the provisional reliability Ri is set to become closer to a specific value (such as 50%) when the recognition distance Lre of the second recognized object Twl2 is shorter, compared to when the recognition distance Lre is longer. As a result, the provisional reliability Ri and the integrated reliability Rt of the first recognized object Tov can be more accurately determined.

H. Eighth Embodiment

Figure 23A:
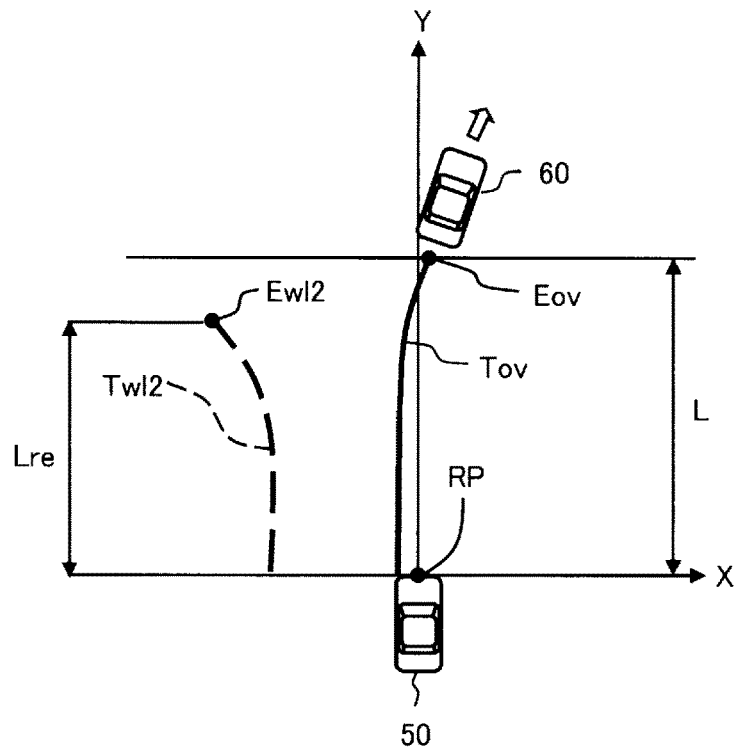
FIG. 23A is an explanatory diagram of a case in which a recognized object meets the extrapolation conditions according to an eighth embodiment.
Figure 23B:
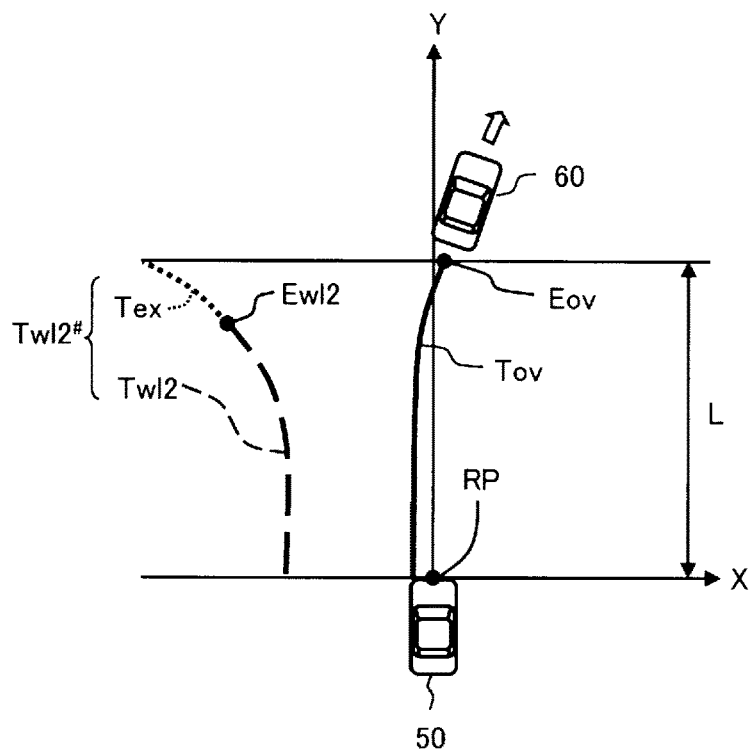
FIG. 23B is an explanatory diagram of a state in which the recognized object is extrapolated according to the eighth embodiment.

As shown in FIG. 23A and FIG. 23B, according to an eighth embodiment as well, in cases in which the travel road boundary line Twl2 that is a recognized object meets extrapolation conditions, the travel road boundary line Twl2 is extrapolated and the feature quantity thereof is calculated, in a manner similar to that according to the sixth embodiment. Here, a case in which the shape of the travel road boundary line Twl2 is erroneously recognized as a result of the effects of a trace of a boundary line that had been previously drawn on the road surface or a line that is drawn on the road surface for some other reason, and the travel road boundary line Twl2 significantly curves to the left side is presumed.

As described according to the above-described sixth embodiment, the recognized object (travel road boundary line Twl2) is basically extrapolated when the provisional reliability Ri of the other recognized object (other vehicle travel locus Tov) composing the recognized object pair with the recognized object (travel road boundary line Twl2) is calculated. This also similarly applies to the above-described seventh embodiment.

Meanwhile, as described below, even in cases in which the provisional reliability Ri of the travel road boundary line Twl2 is calculated, should the likelihood of the shape of the travel road boundary line Twl2 being erroneously recognized be high, a reliability taking into consideration the erroneously recognized shape is preferably determined through extrapolation of the travel road boundary line Twl2.

Whether or not the likelihood of the shape of the travel road boundary line Twl2 being erroneously recognized is high can be determined based on a difference between a shape parameter at a far end Ewl2 of the travel road boundary line Twl2 and a shape parameter at a far end Eov of the other vehicle travel locus Tov. The extrapolation conditions according to the eighth embodiment are set taking this point into consideration.

According to the eighth embodiment, the extrapolation conditions include the two conditions below.

<Condition B1> The provisional reliability Ri of the recognized object (travel road boundary line Twl2) is being calculated.

<Condition B2> The difference between the shape parameter at the far end Ewl2 of the recognized object (travel road boundary line Twl2) and the shape parameter at the far end Eov of the other recognized object (other vehicle travel locus Tov) is equal to or greater than a predetermined difference upper-limit value.

For example, as the shape parameter, the curvature or the lateral-direction offset may be used in a manner similar to that according to the other embodiments described above. For example, in FIG. 23A, the lateral-direction offset at the far end Ewl2 is a negative value because the travel road boundary line Twl2 curves to the left side. Meanwhile, the lateral-direction offset at the far end Eov is a positive value because the other vehicle travel locus Tov curves to the right side. In addition, the difference in lateral-direction offset between the travel road boundary line Twl2 and the other vehicle travel locus Tov is greater than the predetermined difference upper-limit value. Therefore, the above-described condition B2 is met.

As a result, because the extrapolation conditions including the above-described conditions B1 and B2 are met when the provisional reliability Ri of the travel road boundary line Twl2 is calculated, the travel road boundary line Twl2 is extrapolated. When the travel road boundary line Twl2 is extrapolated, the difference in shape parameter between the travel road boundary line Twl2 and the other vehicle locus Tov increases. Therefore, the provisional reliability Ri of the travel road boundary line Twl2 decreases. In this manner, when the likelihood of the travel road boundary line Twl12 being erroneously recognized is high, the provisional reliability Ri thereof can be decreased.

According to the eighth embodiment as well, when the recognized object is extrapolated, the change in the setting of the provisional reliability Ri is preferably performed as described according to the sixth embodiment and the seventh embodiment. However, the change in the setting of the provisional reliability Ri may not be performed.

As described above, according to the eighth embodiment, when the extrapolation conditions including the above-described conditions B1 and B2 are met, the recognized object (travel road boundary line Twl2) is extrapolated and the shape parameter thereof is calculated. Therefore, the provisional reliability Ri of the recognized object that is highly likely to be erroneously recognized can be decreased.

According to the eighth embodiment, the recognized object is preferably extrapolated in cases in which the extrapolation conditions (conditions A1 and A2) described according to the sixth embodiment are met, as well. In this case, according to the eighth embodiment, the extrapolation conditions are considered to be met when either of the above-described conditions A1 and A2 and the above-described conditions B1 and B2 are met. Conditions other than conditions A1, A2, B1, and B2 may be set as the extrapolation conditions. However, predetermined conditions that include a condition that the first recognized object reaches farther than the second recognition condition are preferably set as the extrapolation conditions.

The present disclosure is not limited to the above-described embodiments. Various modes are possible without departing from the spirit of the present disclosure.

What is claimed is:

1. A reliability calculation apparatus that calculates a reliability of a recognized object that is recognized as being present on a route on which a vehicle travels, the reliability of the recognized object being used for driving control of the vehicle, the reliability calculation apparatus comprising:
   a provisional reliability calculating unit that determines, using a processor, a feature quantity of each of a plurality of recognized objects that include at least one of a plurality of types including: travel road boundary lines, a travel locus of another vehicle, and roadside objects, selects a plurality of pairs of recognized objects from the plurality of recognized objects, determines a difference in feature quantity of each pair of recognized objects, and calculates, as a provisional reliability of each pair of recognized objects, a reliability that decreases as the difference in feature quantity increases; and
   an integrated reliability calculating unit that calculates, using the processor, an integrated reliability of each recognized object from the provisional reliabilities of the plurality of pairs of recognized objects, wherein:
   the plurality of recognized objects include a travel road boundary line and a roadside object; and
   the provisional reliability calculating unit sets the provisional reliability related to a pair of recognized objects of the travel road boundary line and the roadside object to a value that is lower than a predetermined value when the travel road boundary line is positioned further towards an outer side than the roadside object.

2. The reliability calculation apparatus according to claim 1, wherein:
   the integrated reliability calculating unit calculates the integrated reliability of each recognized object using a predetermined function in which the provisional reliability is used as a variable.

3. The reliability calculation apparatus according to claim 1, wherein:
   the provisional reliability calculating unit calculates a shape parameter that indicates a shape of the recognized object as the feature quantity.

4. A reliability calculation apparatus that calculates a reliability of a recognized object that is recognized as being present on a route on which a vehicle travels, the reliability of the recognized object being used for driving control of the vehicle, the reliability calculation apparatus comprising:
   a provisional reliability calculating unit that determines, using a processor, a feature quantity of each of a plurality of recognized objects that include at least one of a plurality of types including: travel road boundary lines, a travel locus of another vehicle, and roadside objects, selects a plurality of pairs of recognized objects from the plurality of recognized objects, determines a difference in feature quantity of each pair of recognized objects, and calculates, as a provisional reliability of each pair of recognized objects, a reliability that decreases as the difference in feature quantity increases; and
   an integrated reliability calculating unit that calculates, using the processor, an integrated reliability of each recognized object from the provisional reliabilities of the plurality of pairs of recognized objects, wherein:
   the plurality of recognized objects include a travel road boundary line and a roadside object; and
   the provisional reliability calculating unit sets the provisional reliability related to a pair of recognized objects of the travel road boundary line and the roadside object when the travel road boundary line is positioned further towards an outer side than the roadside object to a value that is lower than a value when the travel road boundary line is positioned further towards an inner side than the roadside object is.

5. The reliability calculation apparatus according to claim 4, wherein:
   the integrated reliability calculating unit calculates the integrated reliability of each recognized object using a predetermined function in which the provisional reliability is used as a variable.

6. The reliability calculation apparatus according to claim 4, wherein:
   the provisional reliability calculating unit calculates a shape parameter that indicates a shape of the recognized object as the feature quantity.

7. A reliability calculation apparatus that calculates a reliability of a recognized object that is recognized as being present on a route on which a vehicle travels, the reliability of the recognized object being used for driving control of the vehicle, the reliability calculation apparatus comprising:
   a provisional reliability calculating unit that determines, using a processor, a feature quantity of each of a plurality of recognized objects that include at least one of a plurality of types including: travel road boundary lines, a travel locus of another vehicle, and roadside objects, selects a plurality of pairs of recognized objects from the plurality of recognized objects, determines a difference in feature quantity of each pair of recognized objects, and calculates, as a provisional reliability of each pair of recognized objects, a reliability that decreases as the difference in feature quantity increases; and
   an integrated reliability calculating unit that calculates, using the processor, an integrated reliability of each recognized object from the provisional reliabilities of the plurality of pairs of recognized objects, wherein:
   the provisional reliability calculating unit calculates a shape parameter that indicates a shape of the recognized object as the feature quantity; and
   when a predetermined extrapolation condition that includes a condition that, of a first recognized object and a second recognized object composing the pair of recognized objects, the first recognized object reaches farther than the second recognized object is met, the provisional reliability calculating unit extrapolates the second recognized object to a distance equal to a distance reached by the first recognized object using an approximate curve of the second recognized object, calculates the shape parameter of the second recognized object, and determines a difference in shape parameter between the first recognized object and the second recognized object.

8. The reliability calculation apparatus according to claim 7, wherein:
   the integrated reliability calculating unit uses a function that is configured such that the provisional reliability does not affect a value of the integrated reliability when the provisional reliability is set to a specific value, as the function for calculating the integrated reliability; and when the second recognized object is extrapolated, and the difference in shape parameter between the first recognized object and the second recognized object is greater than a predetermined difference threshold, the provisional reliability calculating unit sets the provisional reliability to become closer to the specific value when a distance of the extrapolation is long, compared to when the distance is short.

9. The reliability calculation apparatus according to claim 7, wherein:

the provisional reliability calculating unit does not calculate the provisional reliability when the second recognized object is extrapolated and an extrapolation distance exceeds a predetermined upper-limit value.

10. The reliability calculation apparatus according to claim 7, wherein:

the integrated reliability calculating unit uses a function that is configured such that the provisional reliability does not affect a value of the integrated reliability when the provisional reliability is set to a specific value, as the function for calculating the integrated reliability; and when the second recognized object is extrapolated, and the difference in shape parameter between the first recognized object and the second recognized object is greater than a predetermined difference threshold, the provisional reliability calculating unit sets the provisional reliability to become closer to the specific value when a recognition distance of the second recognized object is short, compared to when the recognition distance is long.

11. The reliability calculation apparatus according to claim 10, wherein:

when the second recognized object is extrapolated and the recognition distance of the second recognized object is less than a predetermined lower-limit value, the provisional reliability calculating unit does not calculate the provisional reliability.

12. The reliability calculation apparatus according to claim 7, wherein:

the extrapolation condition further includes a condition that the provisional reliability used to calculate the integrated reliability of the first recognized object is being calculated.

13. The reliability calculation apparatus according to claim 7, wherein:

the extrapolation condition further includes meeting of either of:

(1) the provisional reliability used to calculate the integrated reliability of the first recognized object being calculated; and (2) the provisional reliability used to calculate the integrated reliability of the second recognized object is being calculated, and a difference between the shape parameter at a far end of the second recognized object and the shape parameter at a far end of the first recognized object being equal to or greater than a predetermined difference upper-limit value.

* * * * *